(12) United States Patent
Taguchi et al.

(10) Patent No.: US 7,202,508 B2
(45) Date of Patent: Apr. 10, 2007

(54) ELECTRO-OPTICAL DEVICE AND ELECTRONIC APPARATUS DEVICE

(75) Inventors: Satoshi Taguchi, Matsumoto (JP); Koji Asada, Nagano (JP); Motohiro Kamijima, Nagano (JP)

(73) Assignee: Seiko Epson Corporation (JP)

( * ) Notice: Subject to any disclaimer, the term of this patent is extended or adjusted under 35 U.S.C. 154(b) by 210 days.

(21) Appl. No.: 10/846,838

(22) Filed: May 14, 2004

(65) Prior Publication Data

US 2005/0040760 A1    Feb. 24, 2005

(30) Foreign Application Priority Data

May 15, 2003    (JP) .............................. 2003-137529

(51) Int. Cl.
*H01L 29/22* (2006.01)
(52) U.S. Cl. .............................. 257/98; 257/91; 257/89
(58) Field of Classification Search .................. 257/89, 257/91, 98
See application file for complete search history.

(56) References Cited

U.S. PATENT DOCUMENTS 5,828,434 A * 10/1998 Koden et al. ................ 349/148
5,875,013 A * 2/1999 Hiroshi ........................ 349/110

FOREIGN PATENT DOCUMENTS

| JP | 2001-021900 | 1/2001 |
|---|---|---|
| JP | 2001-159755 | 6/2001 |
| JP | 2002-098955 | 4/2002 |
| JP | 2002-196338 | 7/2002 |
| JP | 2002-214621 | 7/2002 |
| JP | 2002-214622 | 7/2002 |
| JP | 2002-214624 | 7/2002 |
| JP | 2002-287155 | 10/2002 |
| JP | 2002-350866 | 12/2002 |

OTHER PUBLICATIONS

Communication from Japanese Patent Office regarding related application.
Communication from Japanese Patent Office re: counterpart application.
Examination result issued in corresponding Korean application.

* cited by examiner

*Primary Examiner*—Doug Menz
(74) *Attorney, Agent, or Firm*—Harness, Dickey & Pierce, P.L.C.

(57) ABSTRACT

A liquid crystal device is provided that comprises a plurality of R colored layers, a plurality of G colored layers, and a plurality of B colored layers that are formed on either one of a pair of substrates and are aligned in a predetermined arrangement in plan view, a light-shielding layer formed between the colored layers, and a plurality of spacers formed on either one of the pair of substrates and protruding toward the other substrate. The plurality of spacers is formed around the B colored layers and/or the R colored layers, but is not formed around the G colored layers. Thus, even if a positional deviation occurs between the substrates, the spacers do not get into the G colored layers.

9 Claims, 20 Drawing Sheets

PENTILE ARRANGEMENT

ELECTRO-OPTICAL DEVICE AND ELECTRONIC APPARATUS DEVICE

RELATED APPLICATIONS

This application claims priority to Japanese Patent Application No. 2003-137529 filed May 15, 2003 which is hereby expressly incorporated by reference herein in its entirety.

BACKGROUND OF THE INVENTION

1. Technical Field of the Invention

The present invention relates to an electro-optical device comprising color filters composed of R (red), G (green), and B (blue) colored layers and a plurality of spacers formed by a pattern-forming method such as a photolithography process, and to an electronic apparatus.

2. Description of the Related Art

In general, in a liquid crystal device, a liquid crystal layer is interposed between a pair of substrates, the alignment of liquid crystal molecules in the liquid crystal layer is controlled in each display dot, which is a minimum unit of display, and light passing through the liquid crystal layer is modulated in each display dot by the liquid crystal molecules, thereby displaying an image, such as a character, number, or figure, on the downstream side of the liquid crystal layer in the propagating direction of the light.

In such a liquid crystal device, in order to form the liquid crystal layer, it is necessary to form a gap, that is, a so-called cell gap between the pair of substrates. In order to form the cell gap, spacers that are spherical members are dispersed on one of the pair of substrates, and the pair of substrates is attached to each other.

In addition, recently, a structure in which a plurality of protruding spacers are formed on one substrate by a pattern-forming method using a photolithography process and the pair of substrates are attached to each other with the spacers interposed therebetween has been proposed. The spacers are also referred to as columnar spacers.

When the spacers are formed by a photolithography process in this way, the alignment of liquid crystal molecules is disturbed around the spacers, and thus a display defect, such as light leakage, may easily occur. Therefore, the spacers are mainly formed in a light-shielding region that is a non-display region, that is, a so-called black mask region.

In addition, in the liquid crystal device having the spacers formed by the photolithography process, after a plurality of spacers are formed on a substrate, an alignment layer for determining the alignment of the liquid crystal molecules is provided on the spacers by a printing method. Then, an alignment process, for example, rubbing is performed on the alignment layer. When rubbing is performed, it is difficult to perform uniform rubbing if the alignment layer protrudes from the spacers. For example, a region in which rubbing is insufficiently performed occurs on the downstream side of the spacers in the rubbing direction.

Several methods have been proposed to obtain a display with high contrast even when a region subjected to insufficient rubbing occurs due to the existence of the spacers. For example, there has been known a technique of preventing deterioration of the display quality by forming a black mask region, which is a region that does not contribute to display, so as to correspond to the region subjected to insufficient rubbing. In addition, a liquid crystal device in which spacers are formed such that red pixels or blue pixels are situated on the downstream side of the spacers in the rubbing direction has been known.

When manufacturing a liquid crystal device, for example, a series of processes are preformed: color filters are formed on one of a pair of substrates, spacers are formed on the other one of the pair of substrates, the substrates are attached to each other with the spacers interposed therebetween, liquid crystal is injected into a gap between the substrates maintained by the spacers, and a liquid crystal layer is formed. In this case, when the pair of substrates is attached to each other, a positional deviation may occur between the substrates in plan view. In this case, the spacers to be originally situated in a region where a black mask is formed, that is, in a light-shielding region, may be situated in the colored layers of the color filters. As a result, the display quality, such as the contrast, may deteriorate.

In addition, there is another liquid crystal device in which color filters and spacers are formed on one of a pair of substrates. When manufacturing such a liquid crystal device, the color filters are formed at predetermined positions based on alignment marks formed at appropriate positions on the substrate, and then the spacers are formed at predetermined positions based on the same alignment marks or other alignment marks. In this case, when the positions of the spacers are determined based on the alignment marks, a positional deviation may occur. Then, the spacer to be originally formed in the black mask region may be situated in the colored layers of the color filters. Therefore, the display quality, such as the contrast, may deteriorate.

The present invention is designed to solve such problems. Accordingly, an object of the present invention is to provide an electro-optical device including a liquid crystal device having spacers formed by a photolithography process and colored layers constituting color filters, wherein in the electro-optical device, the deterioration of the display quality is prevented even when an assembly error occurs in attaching the substrates or a positional deviation occurs during alignment.

SUMMARY

In order to achieve the above-mentioned object, an electro-optical device according to the present invention comprises a pair of substrates disposed opposite to each other; a plurality of R colored layers, a plurality of G colored layers, and a plurality of B colored layers that are formed on either one of the pair of substrates and are arranged in a predetermined arrangement in plan view; a light-shielding layer formed between the plurality of R colored layers, G colored layers, and B colored layers; and a plurality of spacers formed on either one of the pair of substrates and protruding toward the other substrate, wherein the plurality of spacers is formed in the light-shielding layer around the B colored layers and/or the R colored layers, but is not formed in the light-shielding layer around the G colored layers.

According to such an electro-optical apparatus, the spacers are formed in the light-shielding layer around the B colored layers and/or the R colored layers, but is not formed in the light-shielding layer around the G colored layers. Thus, even if an assembly error occurs between the substrates or a positional deviation occurs during alignment, the spacers may get into the B colored layers or the R colored layers, but may not get into the G colored layers.

However, when the human eye views light components of R, G, and B colors, it is known that the brightness of the light components are different according to their wavelengths even though the amount of energy of the light components is the same. Specifically, even though the energy of the light components of R, G, and B colors is the same, the brightness of the light components is such that G>R>B. This means that when any variation occurs in the G colored region, the human eye perceives that a variation in brightness of the G colored region is very large, compared to a case in which a variation occurs in the R colored region or the B colored region.

According to the electro-optical device of the present invention as described above, even though the spacers may deviate from predetermined positions due to an assembly error for the substrates, the spacers do not get into the G colored regions in which much variation in brightness occurs. Furthermore, although the spacers get into the colored regions, the spacers get into only the B colored regions or the R colored regions. Therefore, brightness does not vary much. Thus, a reduction in contrast can be suppressed.

Next, an electro-optical device according to another embodiment of the present invention comprises a pair of substrates disposed opposite to each other; a plurality of R colored layers, a plurality of G colored layers, and a plurality of B colored layers that are formed on either one of the pair of substrates and are aligned in a predetermined arrangement in plan view; a light-shielding layer provided between the plurality of R colored layers, G colored layers, and B colored layers; and a plurality of spacers provided on either one of the pair of substrates and protruding toward the other substrate, wherein the plurality of B colored layers is formed so as to be arranged in strip shapes in the lengthwise direction or in the widthwise direction, and wherein the plurality of spacers is formed in the light-shielding layer between a pair of the B colored layers adjacent to each other, but is not formed in the light-shielding layer around the G colored layers.

Such an electro-optical apparatus is different from the foregoing electro-optical apparatus in that (1) the plurality of B colored layers is formed so as to be arranged in strip shapes in the lengthwise direction or in the widthwise direction, and (2) the spacers are formed in the light-shielding layer between a pair of the B colored layers adjacent to each other, but is not formed in the light-shielding layer around the G colored layers. For example, an arrangement in which the plurality of B colored layers is formed so as to be arranged in strip shapes in the lengthwise direction or in the widthwise direction is a stripe arrangement of FIG. 5 or a Pentile arrangement of FIG. 12.

According to the electro-optical device of the present invention as described above, even though the spacers may deviate from predetermined positions due to an assembly error for the substrates, the spacers do not get into the G colored regions in which much variation in brightness occurs. Furthermore, although the spacers get into the colored regions, the spacers get into only the B colored regions. Therefore, brightness is hardly varied. Thus, a reduction in contrast can be suppressed.

Next, an electro-optical device according to still another embodiment of the present invention comprises a pair of substrates disposed opposite to each other; a plurality of R colored layers, a plurality of G colored layers, and a plurality of B colored layers that are formed on either one of the pair of substrates and are aligned in a predetermined arrangement in plan view; a light-shielding layer provided between the plurality of R colored layers, G colored layers, and B colored layers; and a plurality of spacers provided on either one of the pair of substrates and protruding toward the other substrate, wherein the plurality of R colored layers is formed so as to be arranged in strip shapes in the lengthwise direction or in the widthwise direction, and wherein the plurality of spacers is formed in the light-shielding layer between a pair of the R colored layers adjacent to each other, but is not formed in the light-shielding layer around the G colored layers.

Such an electro-optical apparatus is different from the foregoing electro-optical apparatus in that (1) the plurality of R colored layers is formed so as to be arranged in strip shapes in the lengthwise direction or in the widthwise direction, and (2) the spacers are formed in the light-shielding layer between a pair of the R colored layers adjacent to each other, but are not formed in the light-shielding layer around the G colored layers. For example, an arrangement in which the plurality of R colored layers is formed so as to be arranged in strip shapes in the lengthwise direction or in the widthwise direction is a stripe arrangement of FIG. 5.

According to the electro-optical device of the present invention as described above, even though the spacers may deviate from predetermined positions due to an assembly error for the substrates, the spacers do not get into the G colored regions in which much variation in brightness occurs. Furthermore, although the spacers get into the colored regions, the spacers get into only the R colored regions. Therefore, brightness is hardly varied. Thus, a reduction in contrast can be suppressed.

Next, an electro-optical device according to still another embodiment of the present invention comprises a pair of substrates disposed opposite to each other; a plurality of R colored layers, a plurality of G colored layers, and a plurality of B colored layers that are formed on either one of the pair of substrates and are aligned in a predetermined arrangement in plan view; a light-shielding layer provided between the plurality of R colored layers, G colored layers, and B colored layers; and a plurality of spacers provided on either one of the pair of substrates and protruding toward the other substrate, wherein the predetermined arrangement has portions in which the B colored layers and the R colored-layers are adjacent to each other in the lengthwise direction or in the widthwise direction, and wherein the plurality of spacers is formed in the light-shielding layer between the B colored layers and the R colored layers adjacent to each other, but is not formed in the light-shielding layer around the G colored layers.

Such an electro-optical device is different from the foregoing electro-optical device in that (1) the arrangement of the colored layers has portions in which the B colored layers and R colored layers are adjacent to each other in the lengthwise direction or in the widthwise direction, and (2) the spacers are formed in the light-shielding layer between the B colored layers and the R colored layers, but are not formed in the light-shielding layer around the G colored layers. An arrangement in which the B colored layers and the R colored layers are adjacent to each other in the lengthwise direction or in the widthwise direction is, for example, a stripe arrangement of FIG. 5, a delta arrangement of FIG. 9, a longitudinal delta arrangement of FIG. 10, an oblique mosaic arrangement of FIG. 11, a Pentile arrangement of FIG. 12, or a pentagonal arrangement of FIG. 13.

According to the electro-optical device of the present invention as described above, even though the spacers may deviate from predetermined positions due to an assembly error for the substrates, the spacers do not get into the G colored regions in which much variation in brightness occurs. Furthermore, although the spacers get into the colored regions, the spacers get into only the B colored regions or the R colored regions. Therefore, brightness is hardly varied. Thus, a reduction in contrast can be suppressed.

Next, an electro-optical device according to still another embodiment of the present invention comprises a pair of substrates disposed opposite to each other; a plurality of R colored layers, a plurality of G colored layers, and a plurality of B colored layers that are formed on either one of the pair of substrates and are aligned in a predetermined arrangement in plan view; a light-shielding layer provided between the plurality of R colored layers, G colored layers, and B colored layers; and a plurality of spacers provided on either one of the pair of substrates and protruding toward the other substrate, wherein the predetermined arrangement has portions in which the B colored layers and the G colored layers are adjacent to each other in the lengthwise direction or in the widthwise direction, and wherein the plurality of spacers is formed between the B colored layers and the G colored layers adjacent to each other such that a portion of each of the spacers extends into the B colored layer, but the spacers do not extend into the G colored layers.

Such an electro-optical device is different from the foregoing electro-optical device in that (1) the arrangement of the colored layers has portions in which the B colored layers and the G colored layers are adjacent to each other in the lengthwise direction or in the widthwise direction, and (2) the spacers are formed between the B colored layers and the G colored layers adjacent to each other such that a portion of each of the spacers extends into the B colored layer, but the spacers do not extend into the G colored layers. An arrangement in which the B colored layers and the G colored layers are adjacent to each other in the lengthwise direction or in the widthwise direction is, for example, a stripe arrangement of FIG. 5, a delta arrangement of FIG. 9, a longitudinal delta arrangement of FIG. 10, an oblique mosaic arrangement of FIG. 11, a Pentile arrangement of FIG. 12, or a pentagonal arrangement of FIG. 13.

According to the electro-optical device of the present invention as described above, even though the spacers may deviate from predetermined positions due to an assembly error for the substrates, the spacers do not get into the G colored regions in which much variation in brightness occurs. Furthermore, although the spacers get into the colored regions, the spacers get into only the B colored regions. Therefore, brightness is hardly varied. Thus, a reduction in contrast can be suppressed.

Next, an electro-optical device according to still another embodiment of the present invention comprises a pair of substrates disposed opposite to each other; a plurality of R colored layers, a plurality of G colored layers, and a plurality of B colored layers that are formed on either one of the pair of substrates and are aligned in a predetermined arrangement in plan view; a light-shielding layer provided in regions between the plurality of R colored layers, G colored layers, and B colored layers; and a plurality of spacers provided on either one of the pair of substrates and protruding toward the other substrate, wherein the predetermined arrangement has portions in which the R colored layers and the G colored layers are adjacent to each other in the lengthwise direction or in the widthwise direction, and wherein the plurality of spacers is formed between the R colored layers and the G colored layers adjacent to each other such that a portion of each of the spacers extends into the R colored layer, but the spacers do not extend into the G colored layers.

Such an electro-optical device is different from the foregoing electro-optical device in that (1) the arrangement of the colored layers has portions in which the R colored layers and the G colored layers are adjacent to each other in the lengthwise direction or in the widthwise direction, and (2) the spacers are formed between the R colored layers and the G colored layers adjacent to each other such that a portion of each of the spacers extends into the R colored layer, but the spacers do not extend into the G colored layers. An arrangement in which the R colored layers and the G colored layers are adjacent to each other in the lengthwise direction or in the widthwise direction is, for example, a stripe arrangement of FIG. 5, a delta arrangement of FIG. 9, a longitudinal delta arrangement of FIG. 10, an oblique mosaic arrangement of FIG. 11, a Pentile arrangement of FIG. 12, or a pentagonal arrangement of FIG. 13.

According to the electro-optical device of the present invention as described above, even if the spacers are situated to deviate from predetermined positions due to an assembly error for the substrates, the spacers do not extend into the G colored regions in which much variation in brightness occurs. Furthermore, although the spacers get into the colored regions, the spacers only get into the R colored regions. Therefore, brightness is hardly varied. Thus, a reduction in contrast can be suppressed.

Next, an electro-optical device according to still another embodiment of the present invention comprises a pair of substrates disposed opposite to each other; a plurality of R colored layers, a plurality of G colored layers, and a plurality of B colored layers that are formed on either one of the pair of substrates and are aligned in a predetermined arrangement in plan view; a plurality of active elements provided on either one of the pair of substrates; a light-shielding layer provided in regions between the plurality of R colored layers, the G colored layers, and the B colored layers and in regions covering the active elements; and a plurality of spacers provided on either one of the pair of substrates and protruding toward the other substrate, wherein the plurality of spacers is formed on the plurality of active elements so as to be situated more close to the B colored layers than to the G colored layers, or more close to the R colored layers than to the G colored layers.

Such an electro-optical device is different from the foregoing electro-optical device in that (1) a plurality of active elements is formed on either one of a pair of substrates, and (2) the spacers are formed on the plurality of active elements so as to be situated more close to the B colored layers than to the G colored layers, or more close to the R colored layers than to the G colored layers.

According to the electro-optical device of the present invention as described above, even though the spacers may deviate from predetermined positions due to an assembly error for the substrates, the spacers do not get into the G colored regions in which much variation in brightness occurs. Furthermore, although the spacers get into the colored regions, the spacers get into only the R colored regions or the B colored regions. Therefore, brightness is hardly varied. Thus, a reduction in contrast can be suppressed.

A two terminal-type switching element, such as a thin film diode (TFD) element, or a three terminal-type switching element, such as a thin film transistor (TFT) element, may be used as an active element. Regions in which the active elements are formed on a substrate are covered with the light-shielding layer. In addition, the regions in which the active elements are formed have a relatively large area. Therefore, when the spacers are formed in the regions, large-sized spacers can be formed therein, or a wide interval can be formed between the spacers and the colored layers.

In the electro-optical device having the aforementioned structure, preferably, the spacers are formed on the other substrate opposite to the substrate on which the R colored layers, the G colored layers, and the B colored layers are formed.

In such an electro-optical device, the relative positional relationship between the spacers and the colored layers is determined when attaching a pair of substrates. If a positional deviation occurs when attaching the pair of substrates to each other, there is a possibility that the spacers may get into the B colored layers and the R colored layers, but there is little possibility that the spacers may get into the G colored layers. As a result, a reduction in contrast can be prevented.

In the electro-optical device having the aforementioned structure, the spacers are preferably formed on the same substrate as the substrate on which the R colored layers, the G colored layers, and the B colored layers are formed.

In such an electro-optical device, when alignment marks are previously provided at appropriate positions on one substrate and R, G, and B colored layers are provided at the desired positions, the positions of the spacers are determined based on the alignment marks. In addition, when the spacers are formed by a photolithography process after the colored layers are formed, the positions of the spacers are determined using the same alignment marks or other alignment marks. As such, at the time of determining the positions of the spacers, the relative positional relationship between the spacers and the colored layers is determined. When a positional deviation occurs during alignment, there is a possibility that the spacers may get into the B colored layers and the R colored layers, but there is little possibility that the spacers may get into the G colored layers. Thus, a reduction in contrast can be prevented.

Next, an electronic apparatus according to an embodiment of the present invention comprises the electro-optical device having the aforementioned structure and controlling means for controlling the operation of the electro-optical device. In such an electronic apparatus, the electro-optical device is used to display, for example, a variety of display information related to the electronic apparatus. According to the electro-optical device of the present invention, a reduction in contrast can be prevented and high-quality display can be achieved. Therefore, high-quality display can also be achieved in the electronic apparatus.

Such an electronic apparatus includes a personal computer, a mobile telephone, a digital still camera, a wristwatch-type electronic apparatus, a personal digital assistants (PDA), a liquid crystal TV, a viewfinder-type or monitor direct view-type video tape recorder, a car navigation apparatus, a pager, an electronic organizer, a calculator, a word processor, a workstation, a moving picture telephone, and a POS terminal.

Next, the present invention relates to a method of manufacturing the electro-optical device having the aforementioned structure in which the spacers are formed on the other substrate opposite to the substrate on which the R colored layers, the G colored layers, and the B colored layers are formed. The method comprises a step of attaching the substrate on which the spacers are formed to the substrate on which the R colored layers, the G colored layers, and the B colored layers are formed.

In such a method of manufacturing the electro-optical device, the relative positional relationship between the spacers and the colored layers is determined when attaching the pair of substrates to each other. If a positional deviation occurs in attaching the pair of substrates, there is a possibility that the spacers may get into the B colored layers and the R colored layers, but there is little possibility that the spacers may get into the G colored layers. Thus, a reduction in contrast can be prevented.

Next, a method of manufacturing the electro-optical device having the aforementioned structure in which the spacers are formed on the same substrate as the substrate on which the R colored layers, the G colored layers, and the B colored layers are formed comprises a step of forming the spacers on the substrate on which the R colored layers, the G colored layers, and the B colored layers are formed, based on alignment marks.

In such a method of manufacturing an electro-optical device, when the alignment marks are previously formed at appropriate positions on one substrate and the R, G, and B colored layers are formed at the desired positions, the positions of the spacers are determined based on the alignment marks. In addition, when the spacers are formed by a photolithography process after the colored layers are formed, the positions of the spacers are determined by the same alignment marks or other alignment marks. As such, at the time of determining the positions of the spacers, the relative positional relationship between the spacers and the colored layers is determined. When a positional deviation occurs during alignment, there is a possibility that the spacers may get into the B colored layers and the R colored layers, but there is little possibility that the spacers may get into the G colored layers. Thus, a reduction in contrast can be prevented.

DETAILED DESCRIPTION

First Embodiment of Electro-optical Device

As an example of an electro-optical device according to the present invention, a transflective liquid crystal device in which a thin film diode (TFD) element is used as an active element will now be described. Herein, the transflective method is a display method which performs both reflective display and transmissive display, wherein reflective display is performed by reflecting external light, such as sunlight or indoor light, from a reflective layer, and transmissive display is performed using light emitted from a backlight towards a substrate. In addition, it is obvious that the electro-optical device to which the present invention is applicable is not limited to the present embodiment.

Figure 1:
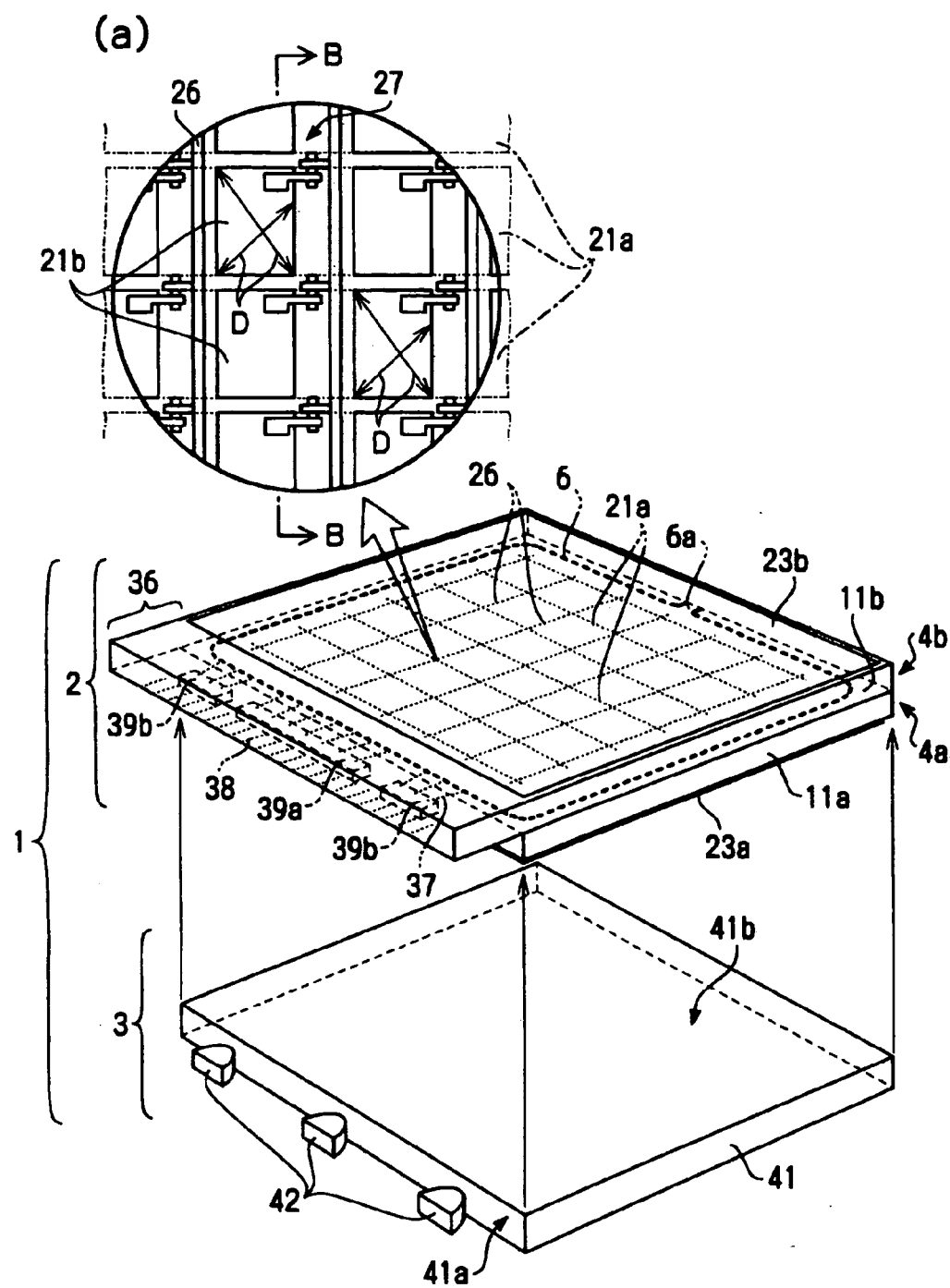
FIG. 1 is an exploded perspective view of an electro-optical device according to an embodiment of the present invention.
Figure 2:
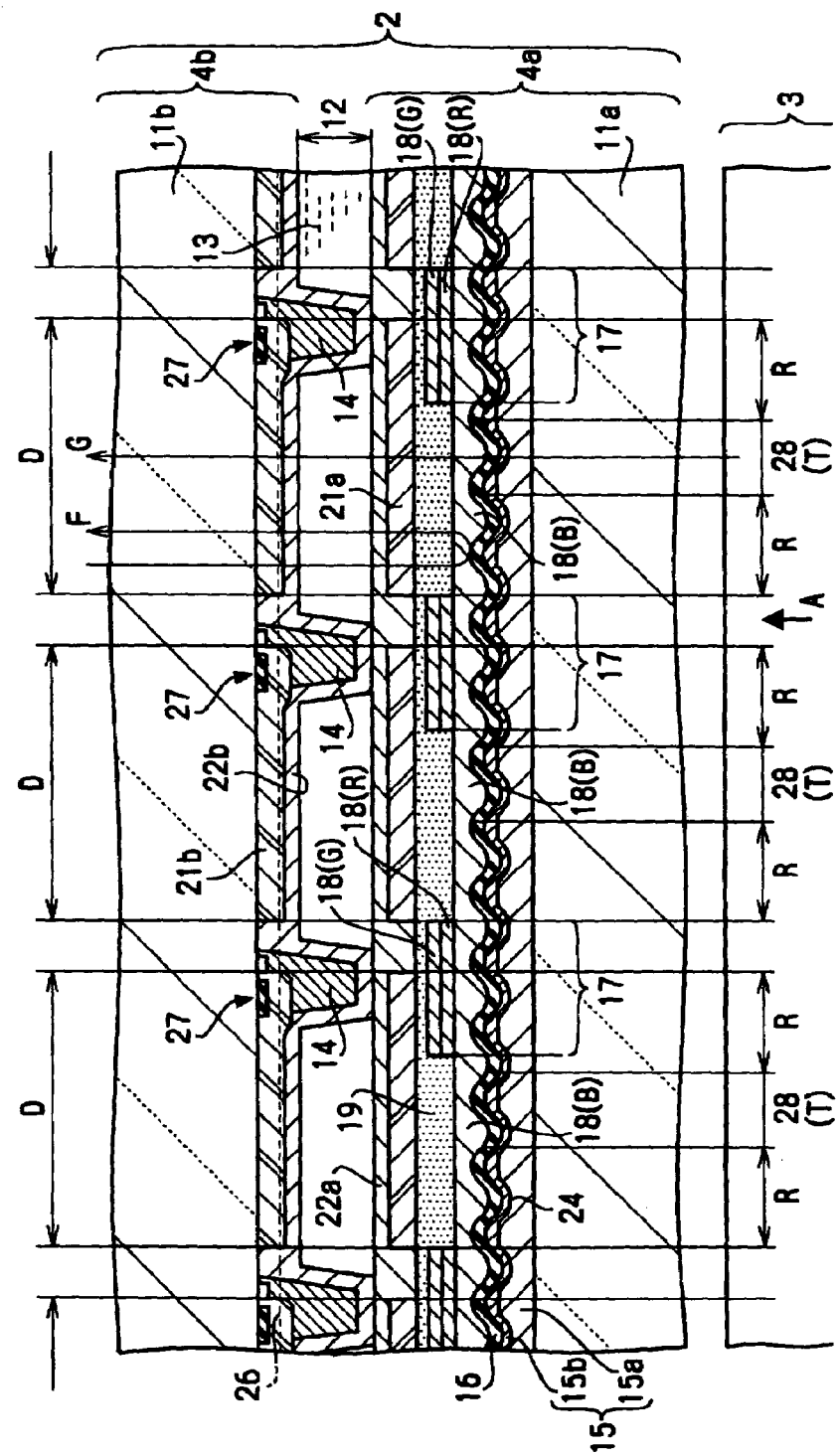
FIG. 2 is a cross-sectional view showing the structure of a main part of the electro-optical device shown in FIG. 1.

In FIG. 1, a liquid crystal device 1 includes a liquid crystal display panel 2 and an illuminating device 3 mounted on the liquid crystal display panel 2. The liquid crystal display panel 2 is formed by attaching a first substrate 4a to a second substrate 4b using a ring-shaped sealing material 6. As shown in FIG. 2, a gap maintained by spacers 14, that is, a so-called cell gap 12, is formed between the first substrate 4a and the second substrate 4b, and liquid crystal is injected into the cell gap 12 to form a liquid crystal layer 13.

In FIG. 2, the first substrate 4a includes a first base member 11a made of transparent glass or plastic. A resin layer 15 is formed on one surface of the first base member 11a facing a liquid crystal layer, and a reflective layer 16 is formed on the resin layer 15. In addition, a light-shielding layer 17 is formed on the reflective layer 16, and a plurality of colored layers 18 is formed in the light-shielding layer 17 as seen from the direction of arrow A in plan view.

Only the colored layer 18 of blue (B), which is one of the three primary colors, is shown in the cross-sectional structure of FIG. 2. However, actually, the colored layers 18 of red (R) and green (G), which are the other two of the three primary colors, are formed at positions different from that of the blue colored layer 18 as seen from the direction of arrow A in plan view. In general, the plurality of colored layers 18, each having R, G, and B colors, is properly aligned in a planar arrangement. However, in the present embodiment, for example, the plurality of colored layers 18 is arranged in a stripe arrangement as shown in FIG. 5.

Figure 5:
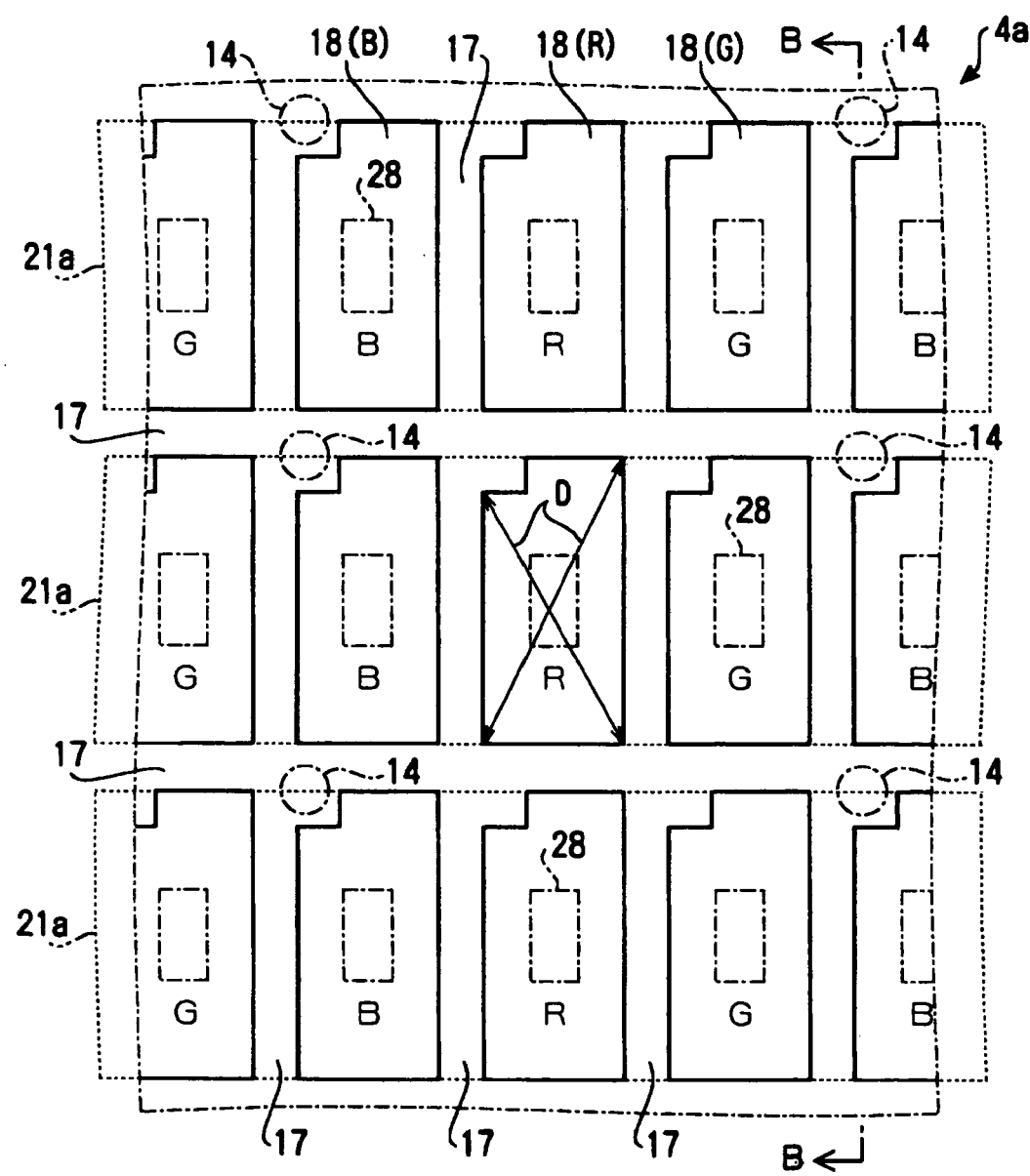
FIG. 5 is a partial plan view of a substrate on which colored layers are formed.

This stripe arrangement is an arrangement in which the same colors are arranged in a line in the lengthwise direction of FIG. 5, and R, G, and B colors are alternately and repeatedly arranged in the horizontal direction of FIG. 5. In addition, as shown in FIG. 5, the light-shielding layer 17 is formed in a lattice shape so as to surround each colored layer 18. Furthermore, an upper left corner of each colored layer 18 is cut off, and the light-shielding layer 17 is formed more widely at that position in order to allow an active element to be provided corresponding to that position. In the present embodiment, the light-shielding layer 17 is formed by laminating the colored layers 18 of R, G, and B colors. The light-shielding layer 17 may also be formed by patterning an appropriate light-shielding material, such as chrome (Cr), in a lattice shape using an appropriate patterning method such as a photolithography process.

Referring to FIG. 2, an overcoat layer 19 is formed on the light-shielding layer 17 and the colored layers 18, a plurality of band-shaped transparent electrodes 21a is formed on the overcoat layer 19, and an alignment film 22a is formed on the band-shaped transparent electrodes 21a. Alignment processing, for example, rubbing is performed on the alignment film 22a so that the alignment of liquid crystal molecules in the vicinity of the alignment film 22a is determined. In addition, a polarizing plate 23a shown in FIG. 1 is mounted on the external surface of the first base member 11a by bonding. One transparent electrode 21a having a strip shape is extended in a direction perpendicular to the plane of FIG. 2, and the light-shielding layer 17 is situated between adjacent electrodes 21a. As a result, the plurality of electrodes 21a is formed in a stripe shape as seen from the direction of arrow A.

In FIG. 2, the resin layer 15 includes a first layer 15a and a second layer 15b stacked on the first layer 15a. The first and second layers 15a and 15b may be made of the same material. A plurality of concave portions 24, which are dot portions, is arranged on the surface of the first layer 15a irregularly, that is, randomly, as seen from the direction of arrow A in plan view. Thus, unevenness is formed on the surface of the second layer 15b stacked on the first layer 15a so as to correspond to the plurality of concave portions 24 and convex portions adjacent to the concave portions 24. The unevenness formed on the surface of the first layer 15a is rough, and smooth unevenness can be formed by stacking the second layer 15b on the unevenness. Unevenness is formed on the surface of the second layer 15b, that is, on the surface of the resin layer 15, so that unevenness is also formed on the surface of the reflective layer 16 stacked on the resin layer 15. Due to the existence of the unevenness, light incident on the reflective layer 16 is changed into diffused light when reflected.

In FIG. 2, the second substrate 4b opposite to the first substrate 4a includes a second base member 11b made of transparent glass or plastic. Line-shaped wiring lines 26 extending in the right and left directions of FIG. 2, a plurality of TFD elements 27, which are active elements, and a plurality of transparent dot electrodes 21b are formed on the surface of the second base member 11b facing the liquid crystal layer. In addition, a plurality of spacers 14 is provided so as to overlap with the edges of the respective dot electrodes 21b, and an alignment film 22b is formed on the above-described each element. An alignment process, for example, rubbing is performed on the alignment film 22b so that the alignment of liquid crystal molecules in the vicinity of the alignment film 22b is determined. The rubbing direction of the alignment film 22a on the side of the first substrate 4a and the rubbing direction of the alignment film 22b on the side of the second substrate 4b intersect with each other at an appropriate angle in accordance with the characteristics of the liquid crystal. Further, a polarizing plate 23b shown in FIG. 1 is mounted on the external surface of the second base member 11b by bonding.

However, FIG. 1(a) illustrates the planar structure of a minute region inside the liquid crystal display panel 2. In FIG. 1, the dot electrodes 21b and the TFD elements 27 formed on the second substrate 4b are represented in solid lines in a state where the second base member 11b is omitted, and the band-shaped electrodes 21a formed on the first substrate 4a are represented in one-dot chain lines. As shown in FIG. 1, the dot electrodes 21b are formed in a dot shape similar to a square or rectangle and are connected to the wiring lines 26 through the TFD elements 27. In addition, FIG. 2 is a cross-sectional view taken along the line B—B of FIG. 1(a).

As shown in FIG. 1(a), the band-shaped electrodes 21a on the side of the first substrate 4a extend in a direction perpendicular to the wiring lines 26 on the side of the second substrate 4b and are formed parallel to a direction perpendicular to the wiring lines 26 at predetermined intervals; that is, they are generally formed in a stripe shape. In addition, the band-shaped electrodes 21a are formed to be opposite to the plurality of dot electrodes 21b arranged in a line perpendicular to the wiring lines 26. Regions, in which the dot electrodes 21b and the band-shaped electrodes 21a overlap with each other, constitute display dots D, which are the minimum unit of display.

As shown in FIG. 5, the reflective layer 16 in FIG. 2 has apertures 28 for light transmission to correspond to the respective display dots D. The apertures 28 have a structure for transmitting light to the reflective layer 16. However, instead of forming the apertures 28, the reflective layer 16 may have both a function for reflecting light and a function for transmitting light by making the thickness of the reflective layer 16 thin. In FIG. 2, a region corresponding to the aperture 28 is a light-transmitting region T, and a region around the light-transmitting region T, in which the reflective layer 16 is formed, is a light-reflecting region R.

As shown in FIG. 5, each of the colored layers 18 is formed to correspond to the display dot D. In case of black and white display without using the colored layers 18, one pixel is formed by one display dot D. However, as in the present embodiment, in a case in which color display is performed using the R, G and B colored layers 18, one pixel is composed of the three colored layers 18 corresponding to R, G, and B colors.

Figure 3:
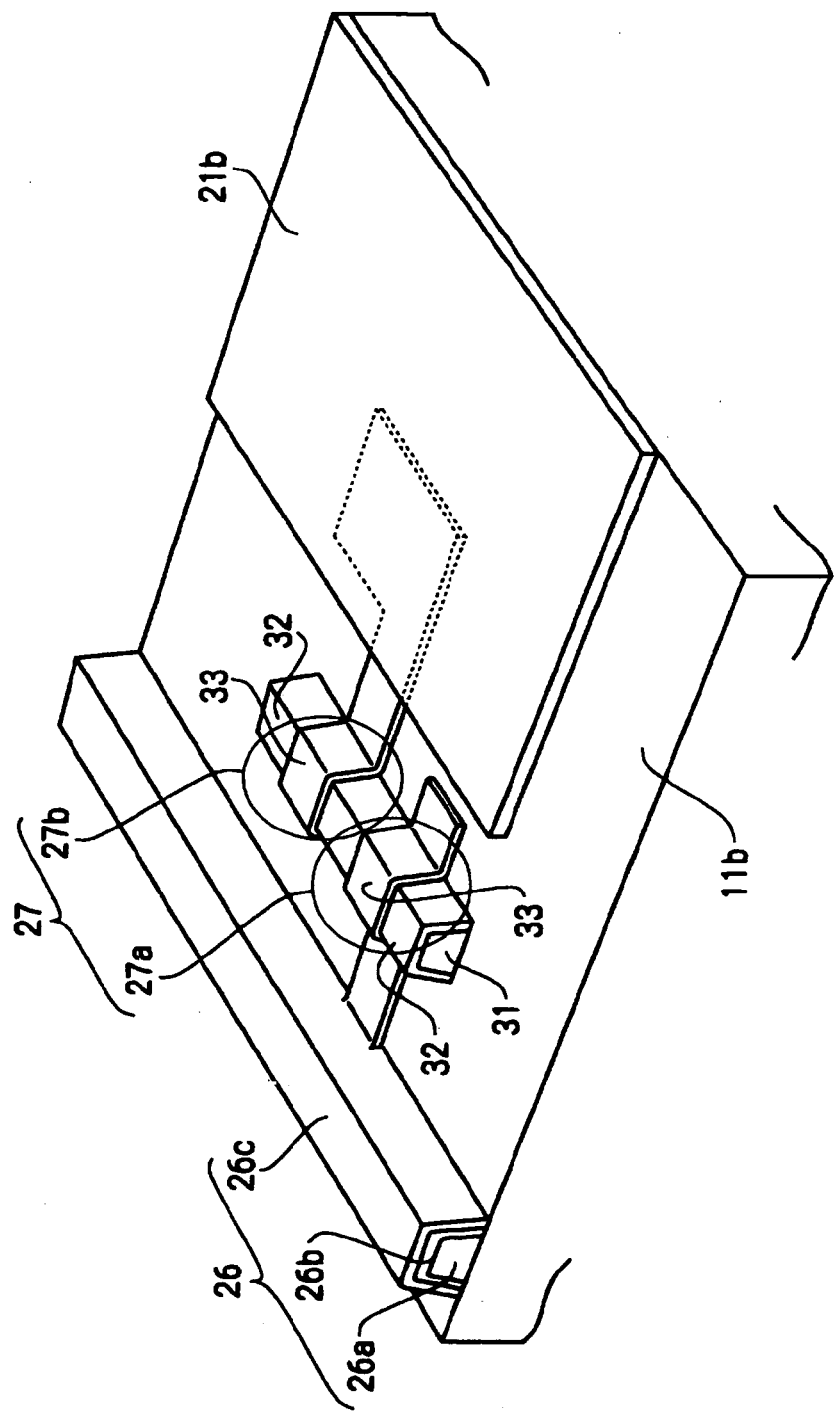
FIG. 3 is a perspective view showing a TFD element used in the electro-optical device shown in FIG. 1.

As shown in FIG. 3, a TFD element 27 is formed by connecting a first TFD element 27a to a second TFD element 27b in series. For example, the TFD element 27 is formed as follows. That is, first, a first layer 26a of a wiring line 26 and a first metal layer 31 of the TFD element 27 are formed of tantalum (Ta). Next, a second layer 26b of the wiring line 26 and an insulating film 32 of the TFD element 27 are formed by an anode oxidation process. Subsequently, for example, a third layer 26c of the wiring line 26 and a second metal layer 33 of the TFD element 27 are formed of chrome (Cr).

The second metal layer 33 of the first TFD element 27a extends from the third layer 26c of the wiring line 26. In addition, the dot electrode 21b is formed so as to overlap with the front end of the second metal layer 33 of the second TFD element 27b. Considering an electrical signal flowing from the wiring line 26 to the dot electrode 21b, in the first TFD element 27a, an electrical signal flows in the order of the second electrode 33→the insulating layer 32→the first metal layer 31 along the current direction of the electrical signal. Meanwhile, in the second TFD element 27b, an electrical signal flows in the order of the first metal layer 31→the insulating layer 32→the second metal layer 33.

That is, a pair of TFD elements whose electrical polarities are different from each other is connected in series to each other between the first TFD element 27a and the second TFD element 27b. This structure is generally referred to as a back-to-back structure. It is known that the TFD element having this structure has more stable characteristics compared to a case where only one TFD element is used.

In FIG. 1, the second substrate 4b includes a protruding portion 36 protruding from the external side of the first substrate 4a, and wiring lines 37 and terminals 38 are formed on the surface of the protruding portion 36 facing the first substrate 4a. One driving IC 39a and two driving ICs 39b are mounted in a region including the wiring lines 37 and the terminals 38 by an anisotropic conductive film (ACF) (not shown).

The wiring lines 37 and the terminals 38 are simultaneously formed when the wiring lines 26 and the dot electrodes 21b are formed on the second substrate 4b. In addition, the wiring lines 26 extend to the protruding portion 36 to form the wiring lines 37, and the wiring lines 37 are connected to the driving IC 39a. In addition, a spherical or cylindrical conductive material (not shown) is mixed into a sealing material 6 used to attach the first substrate 4a to the second substrate 4b. The band-shaped electrodes 21a that are formed on the first substrate 4a are extended to the sealing material 6 on the first substrate 4a and are connected to the wiring lines 37 on the second substrate 4b by the conductive material inside the sealing material 6. As a result, the band-shaped electrodes 21a formed on the first substrate 4a are connected to the driving ICS 39b on the second substrate 4b.

In FIG. 1, the illuminating device 3, which is opposite to the external surface of the first substrate 4a constituting the liquid crystal display panel 2, includes, for example, a plate-shaped light guide 41 made of a transparent plastic material and an LED 42, functioning as a point light source. A light-reflecting sheet (not shown) may be mounted on the surface of the light guide 41 opposite to the liquid crystal display panel 2. In addition, a light-diffusing sheet (not shown) may be mounted on the surface of the light guide 41 facing the liquid crystal display panel 2. Furthermore, a prism sheet (not shown) may be mounted on the light-diffusing sheet.

Three LEDs 42 are used in the present embodiment. However, as necessary, only one LED may be used, or a plurality of LEDs may be used. In addition, a linear light source, such as a cold cathode fluorescent lamp (CCFL), may be used instead of a point light source such as an LED.

Hereinafter, the operation of the liquid crystal device having the aforementioned structure will be described.

When external light, such as sunlight or indoor light, is sufficient, as indicated by arrow F in FIG. 2, the external light is transmitted into the liquid crystal display panel 2 through the second substrate 4b, passes through the liquid crystal layer 13, is reflected from the reflective layer 16, and is supplied to the liquid crystal layer 13 again.

Meanwhile, when the external light is insufficient, the LED 42 (see FIG. 1) constituting the illuminating device 3 turns on. At this time, light emitted from the LED 42 in the form of a point is introduced into the light guide 41 through a light incident surface 41a of the light guide 41 and is then emitted as plane light from a surface opposite to the liquid crystal display panel 2, that is, a light exit surface 41b. In this way, as indicated by arrow G in FIG. 2, light emitted from the light exit surface 41b passes through the apertures 28 formed on the reflective layer 16 and is then supplied to the liquid crystal layer 13 as plane light.

As such, when light is supplied to the liquid crystal layer 13, the liquid crystal display panel 2 is controlled by the driving ICs 39a and 39b (see FIG. 1), for example, scanning signals are supplied to the wiring lines 26, and simultaneously, for example, data signals are supplied to the band-shaped electrodes 21a. At this time, if a TFD element 27 associated with a specific display dot is in a selected state (that is, in an on state) according to the potential difference between the scanning signal and the data signal, an image signal is written in a storage capacitor inside the display dot. Thereafter, if the TFD element 27 is in a non-selected state (that is, in an off state), the signal is stored in the display dot to drive the liquid crystal layer in the display dot.

In this way, liquid crystal molecules in the liquid crystal layer 13 are controlled in each display dot, and light passing through the liquid crystal layer 13 is modulated in each display dot D. The modulated light passes through the polarizing plate 23b on the side of the second substrate 4b, so that an image, such as a character, a number, or a figure, is displayed on an effective display region of the liquid crystal display panel 2. Reflective display is performed using external light reflected from the reflective layer 16. In addition, transmissive display is performed using light emitted from the illuminating device 3. In the present embodiment, the reflective display and transmissive display are automatically selected according to the user's preference or a change in the external environment.

In the liquid crystal device having the above structure, the spacers 14 made of a photosensitive resin are formed as, for example, a truncated cone, a truncated pyramid, or other shapes by a patterning method using a photolithography process. In the present embodiment, the spacers 14 are formed as a truncated cone whose upper side faces the first substrate 4a and whose bottom side faces the second substrate 4b.

Figure 4:
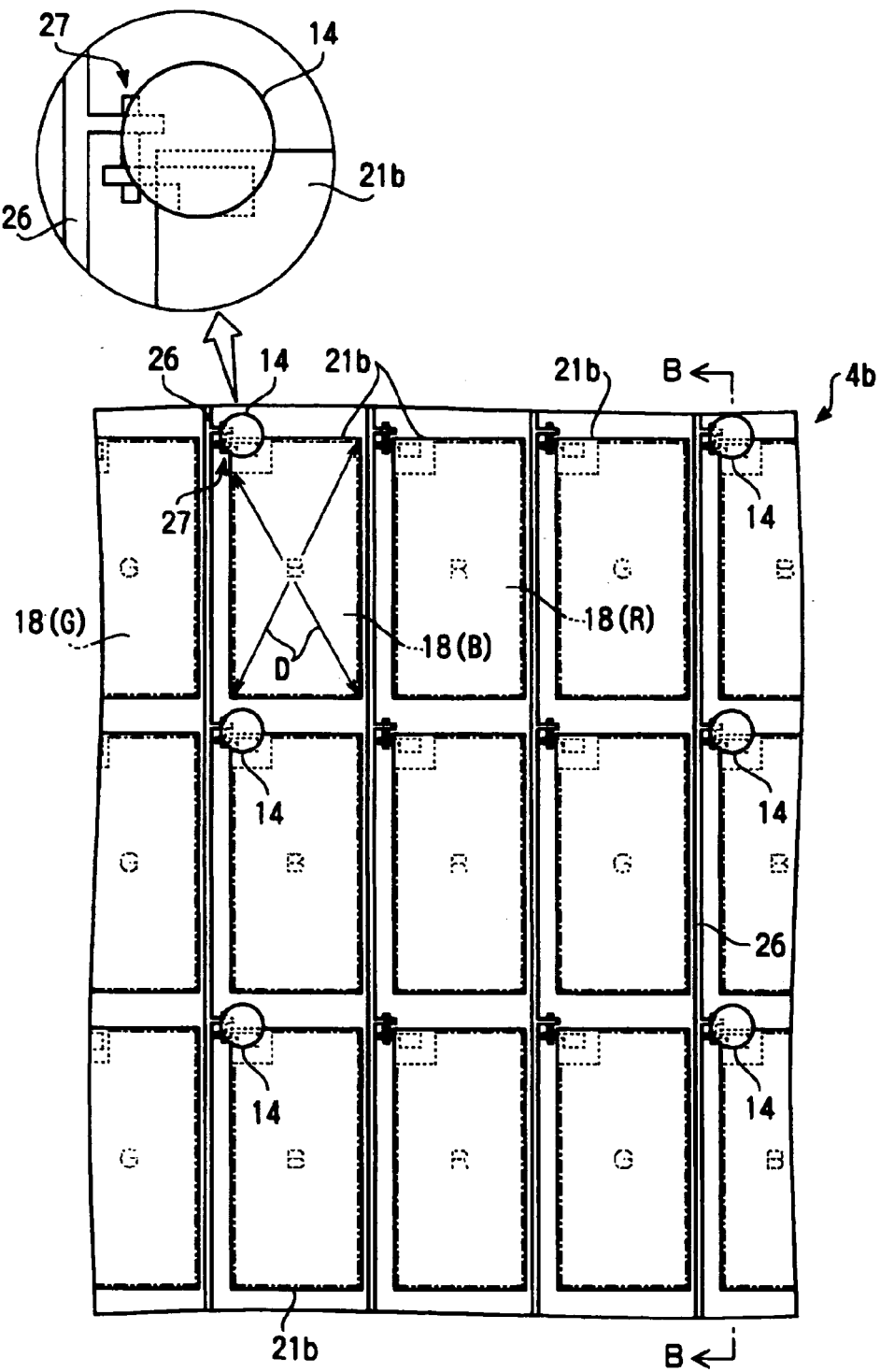
FIG. 4 is a partial plan view of a substrate on which elements are formed.

In addition, as shown in FIG. 4, the spacers 14 are provided so as to correspond to only the display dots D including the B colored layers 18(B) of the R, G, and B colored layers 18(R), 18(G), and 18(B) aligned in a stripe arrangement. Furthermore, each of the spacers 14 is formed so as to two-dimensionally overlap with a part of the TFD element 27 extending from the wiring line 26 and with the corner of the dot electrode 21a connected to the TFD element 27. Moreover, the spacers 14 are formed at positions closer to the B colored layers 18(B) than to the G colored layers 18(G).

When the liquid crystal device according to the present embodiment is manufactured, the first substrate 4a shown in FIG. 5 and the second substrate 4b shown in FIG. 4 are attached to each other using the sealing material 6 (see FIG. 1). In this case, for example, the two substrates 4a and 4b are attached to each other while comparing a first mark formed at an appropriate position on the first substrate 4a with a second mark formed at an appropriate position on the second substrate 4b so as to achieve a predetermined positional relationship therebetween. When the two substrates 4a and 4b are normally attached to each other, as shown in FIG. 5, each spacer 14 is situated in the light-shielding layer 17 corresponding to a cut-out region of the corner of the B colored layer 18(B).

However, when manufacturing the liquid crystal device, the first substrate 4a and the second substrate 4b are not always attached to each other without a positional deviation therebetween, and a positional deviation therebetween may inevitably occur within an allowable limit or tolerance. In the present embodiment, the spacers 14 are formed in the cut-out regions of the B colored layers 18(B) and at positions closer to the B colored layers 18(B) than to the G colored layers 18(G). Thus, even if a positional deviation occurs between the two substrates when the first and second substrates 4a and 4b are attached to each other, the spacers 14 may get into the B colored layers 18(B), but do not get into the G colored layers 18(G).

However, when the human eye views light components of R, G, and B colors, the brightness of the light components are different from each other according to their wavelengths even though the amount of energy of each of the light components is the same. More specifically, even though the energy of each of the light components of R, G, and B colors is the same, the brightness of the light components is such that G>R>B. This means that, when a variation occurs in a G colored region, the human eye perceives that a variation in brightness of the G colored region is very large, compared to a case where a variation occurs in an R colored region or a B colored region.

In the liquid crystal device according to the present embodiment, as described above, even if a positional deviation occurs between the spacers 14 due to an assembly error for the substrates, the spacers 14 may get into only the B colored regions, but do not get into the G colored regions in which brightness is largely varied. Accordingly, even if a positional deviation occurs between the substrates, the brightness of the display is not largely varied, and thus, a reduction in contrast can be suppressed, thereby obtaining a high-quality display.

Second Embodiment of Electro-optical Device

In the aforementioned embodiment, as shown in FIG. 4, the spacers 14 are formed in the cut-out regions of the B colored layers 18(B), that is, in regions corresponding to active element-forming regions. Alternatively, the spacers 14 may be formed in the cut-out regions of the R colored layers 18(R). Since the brightness of display is such that G>R>B as described above, a reduction in contrast can be prevented even if a positional deviation occurs between the substrates, compared to a case where the spacers 14 get into the G colored regions.

In addition, as can easily be seen from FIG. 4, in a stripe arrangement of R, G, and B colors used in the present embodiment, the B colored regions are situated in the vicinity of the cut-out regions of the R colored layers 18(R), but the G colored regions are not situated therein. Thus, according to the present embodiment in which the spacers 14 are formed in the cut-out regions of the R colored layers 18(R), even if a positional deviation occurs between the substrates, the spacers 14 are prevented from getting into the G colored regions.

Third Embodiment of Electro-optical Device

Figure 6:
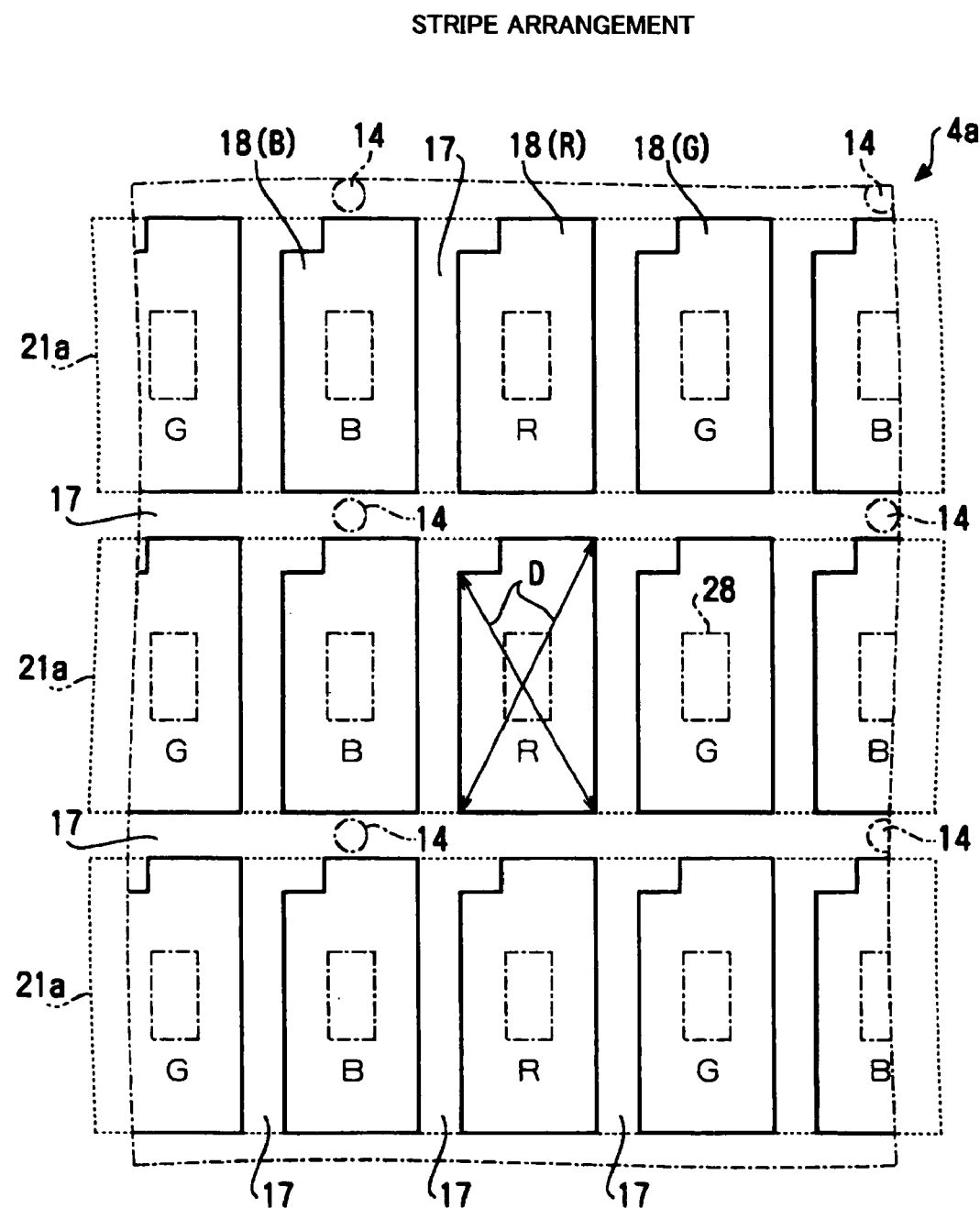
FIG. 6 is a plan view showing a part of the substrate on which the colored layers are formed as a main part of an electro-optical device according to another embodiment of the present invention.

FIG. 6 shows an electro-optical device according to still another embodiment of the present invention. In particular, FIG. 6 shows the positional relationship between the spacers 14 and the colored layers 18. The liquid crystal device of FIG. 6 includes the colored layers 18 of R, G, and B colors aligned in a stripe arrangement. In the present embodiment, the spacers 14 are formed at positions corresponding to a light-shielding layer 17 around the B colored layers 18(B), but are not formed at positions corresponding to the light-shielding layer 17 around the G colored layers 18(G).

In addition, in the present embodiment, the spacers 14 are formed in the light-shielding layer 17 between a plurality of adjacent B colored layers 18(B) arranged in a line in the lengthwise direction, but are not formed in the light-shielding layer 17 around the G colored layers 18(G).

According to this arrangement for the spacers 14, even if a relative positional deviation occurs between the pair of substrates opposite to each other, the spacers 14 are prevented from getting into the G colored regions. In addition, the plurality of spacers 14 may be formed between adjacent B colored layers 18(B).

Fourth Embodiment of Electro-optical Device

In addition, FIG. 6 shows the relative positional relationship between the spacers 14 and the B colored layers 18(B) or G colored layers 18(G). This relationship is also applied to the relative positional relationship between the spacers 14 and the R colored layers 18(R) or the G colored layers 18(G).

In other words, the spacers 14 may be formed in the light-shielding layer 17 around the R colored layers 18(R), but may not be formed in the light-shielding layer 17 around the G colored layers 18(G).

Furthermore, in the present embodiment, the spacers 14 may be formed in the light-shielding layer 17 between a plurality of adjacent R colored layers 18(R) arranged in a line in the lengthwise direction, but may not be formed in the light-shielding layer 17 around the G colored layers 18(G).

According to this arrangement for the spacers 14, even if a relative positional deviation occurs between a pair of substrates opposite to each other, the spacers 14 can be prevented from getting into the G colored regions. In addition, a plurality of spacers 14 may be formed between adjacent R colored layers 18(R).

Fifth Embodiment of Electro-optical Device

Figure 7:
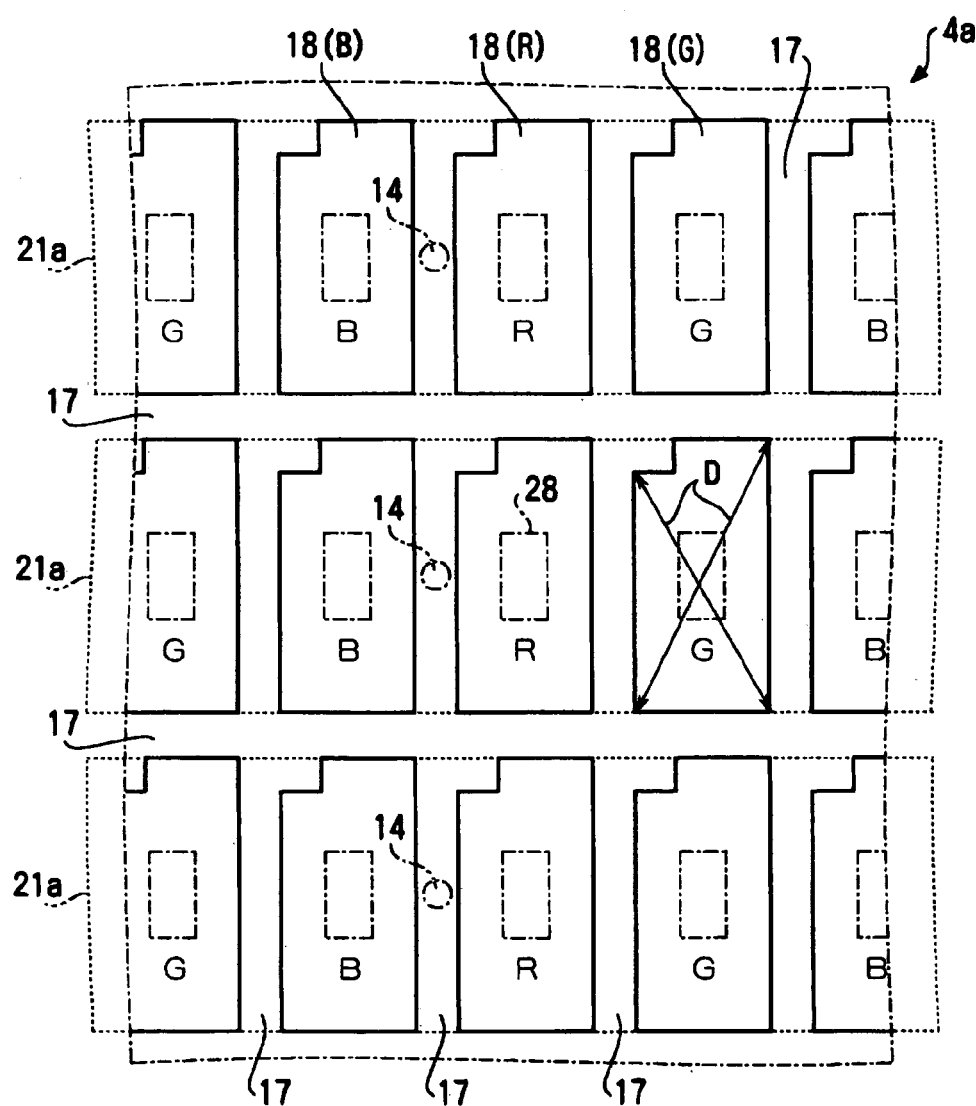
FIG. 7 is a plan view showing a part of the substrate on which the colored layers are formed as a main part of the electro-optical device according to still another embodiment of the present invention.

FIG. 7 shows an electro-optical device according to still another embodiment of the present invention. In particular, FIG. 7 shows the positional relationship between the spacers 14 and the colored layers 18. In the present embodiment, the colored layers 18 of R, G, and B colors are aligned in a stripe arrangement. Therefore, the B colored layers 18(B) and the R colored layers 18(R) are adjacent to each other in the horizontal direction. Thus, the spacers 14 are formed in the light-shielding layer 17 between the B colored layers 18(B) and the R colored layers-18(R) adjacent to each other, but are not formed in the light-shielding layer 17 around the G colored layers 18(G).

According to this arrangement for the spacers 14, even if a relative positional deviation occurs between a pair of substrates opposite to each other, the spacers 14 are prevented from getting into the G colored regions. In addition, a plurality of spacers 14 may be formed between the B colored layers 18(B) and the R colored layers 18(R).

Sixth Embodiment of Electro-optical Device

Figure 8:
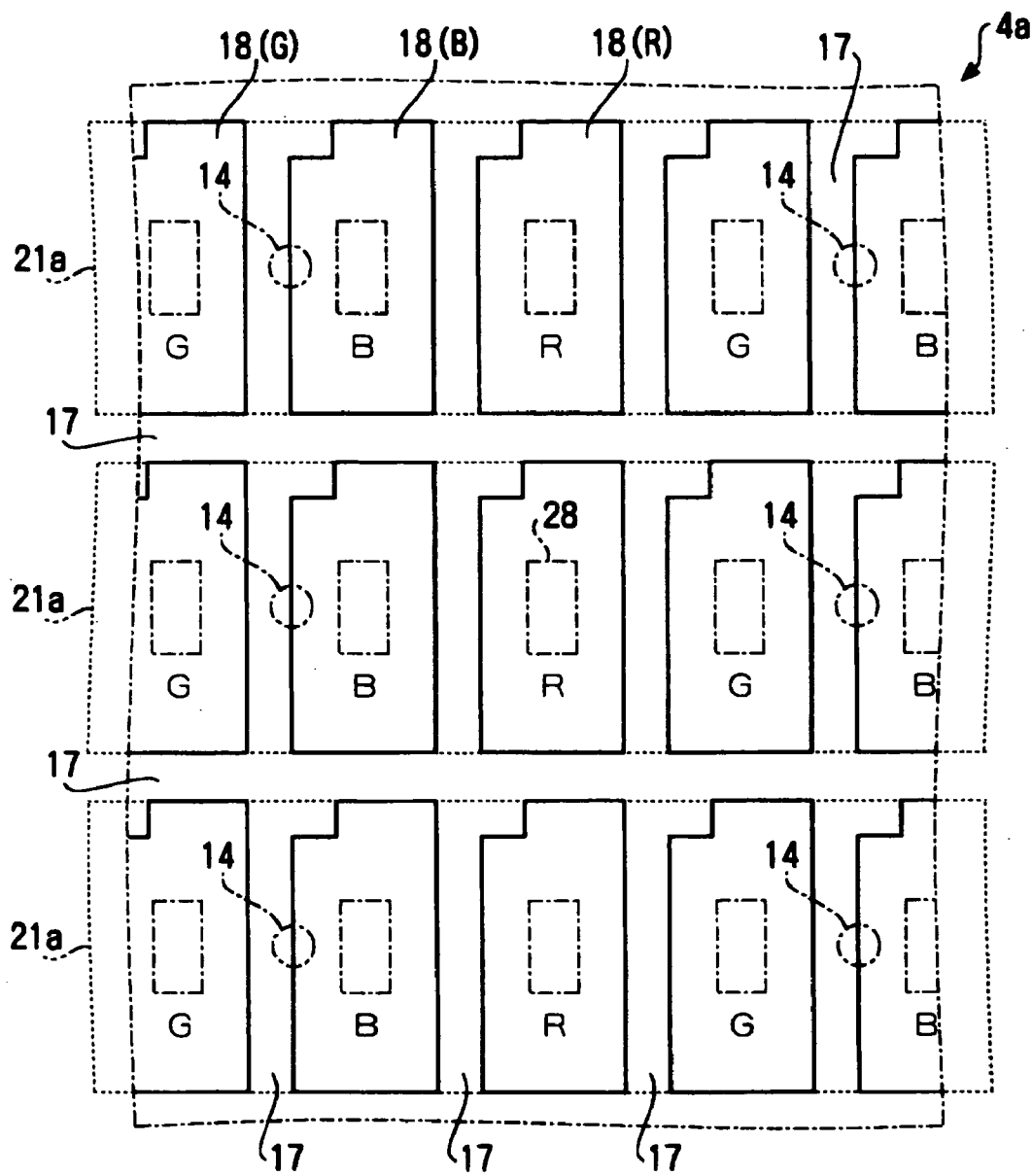
FIG. 8 is a plan view showing a part of the substrate on which the colored layers are formed as a main part of the electro-optical device according to still another embodiment of the present invention.

FIG. 8 shows an electro-optical device according to yet still another embodiment of the present invention. In particular, FIG. 8 shows the positional relationship between the spacers 14 and the colored layers 18. In the present embodiment, the colored layers 18 of R, G, and B colors are aligned in a stripe arrangement. Therefore, the B colored layers 18(B) and the G colored layers 18(G) are adjacent to each other in the horizontal direction. Thus, each of the spacers 14 is formed between the B colored layer 18(B) and the G colored layer 18(G) adjacent to each other such that a part of the spacer 14 extends into the B colored layer 18(B), but it does not extend into the G colored layer 18(G).

According to this arrangement for the spacers 14, even if a relative positional deviation occurs between a pair of substrates opposite to each other, the spacers 14 are prevented from getting into the G colored regions. In addition, a plurality of spacers 14 may be formed between the B colored layers 18(B) and the G colored layers 18(G).

Seventh Embodiment of Electro-optical Device

FIG. 8 shows the relative positional relationship between the spacers 14 and the B colored layers 18(B) or the G colored layers 18(G). This relation is also applied to the relative positional relationship between the spacers 14 and the R colored layers 18(R) or the G colored layers 18(G).

In other words, when the R colored layers 18(R) and the G colored layers 18(G) are adjacent to each other in the horizontal direction, each of the spacers 14 may be formed between the R colored layer 18(R) and the G colored layer 18(G) adjacent to each other such that a part of the spacer 14 extends into the R colored layer 18(R), but it does not extends into the G colored layer 18(G).

According to this arrangement for the spacers 14, even if a relative positional deviation occurs between a pair of substrates opposite to each other, the spacers 14 are prevented from getting into the G colored regions. In addition, a plurality of spacers 14 may be formed between the R colored layers 18(R) and the G colored layers 18(G).

Eighth Embodiment of Electro-optical Device

Figure 9:
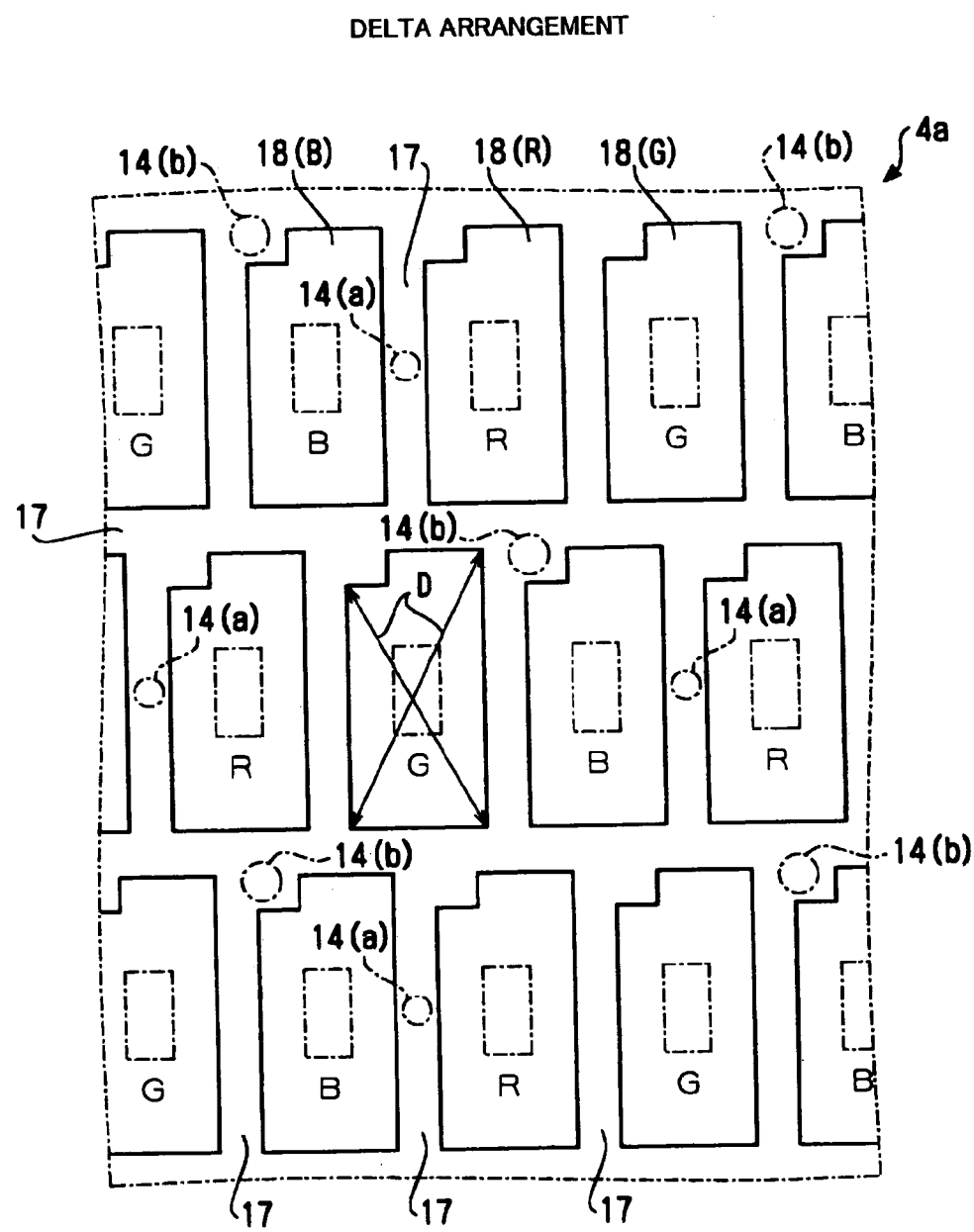
FIG. 9 is a plan view showing a part of the substrate on which the colored layers are formed as a main part of the electro-optical device according to still another embodiment of the present invention.

FIG. 9 shows an electro-optical device according to still another embodiment of the present invention. In particular, FIG. 9 shows the positional relationship between the spacers 14 and the colored layers 18. In the present embodiment, the colored layers 18 of R, G, and B colors are aligned in a delta arrangement. In this delta arrangement, a triangular pattern, in which R, G, and B colors are apexes thereof, are arranged in a line in the horizontal direction.

In this delta arrangement, as indicated by reference numeral 14(*a*), the spacers 14 may be arranged between the B colored layers 18(B) and the R colored layers 18(R), but may not be arranged around the G colored layers 18(G). In addition, as indicated by reference numeral 14(*b*), the spacers 14 may be formed in regions for forming active elements corresponding to the B colored layers 18(B). That is, the spacers 14 may be formed more close to the B colored layers 18(B) than to the G colored layers 18(G).

According to this arrangement for the spacers 14, even if a relative positional deviation occurs between a pair of substrates opposite to each other, the spacers 14 are prevented from getting into the G colored regions. In addition, a plurality of spacers 14 may be formed between the respective colored layers 18.

Ninth Embodiment of Electro-optical Device

Figure 10:
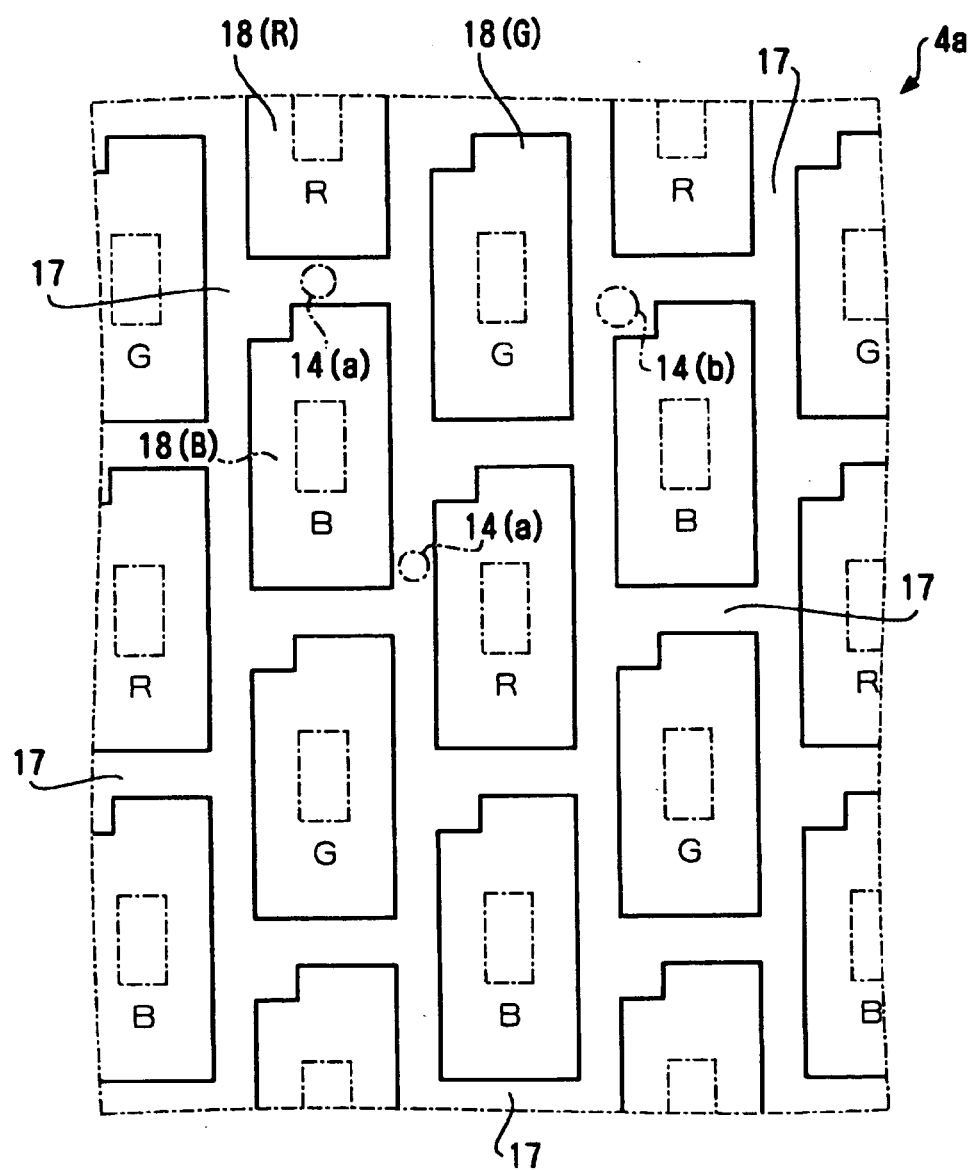
FIG. 10 is a plan view showing a part of the substrate on which the colored layers are formed as a main part of the electro-optical device according to still another embodiment of the present invention.

FIG. 10 shows an electro-optical device according to still another embodiment of the present invention. In particular, FIG. 10 shows the positional relationship between the spacers 14 and the colored layers 18. In the present embodiment, the colored layers 18 of R, G, and B colors are aligned in a longitudinal delta arrangement. In this longitudinal delta arrangement, a triangular pattern, in which R, G, and B colors are apexes thereof, is arranged in a line in the longitudinal direction.

In this longitudinal delta arrangement, as indicated by reference numeral 14(*a*), the spacers 14 may be arranged between the B colored layers 18(B) and the R colored layers 18(R), but may not be arranged around the G colored layers 18(G). In addition, as indicated by reference numeral 14(*b*), the spacers 14 may be formed in regions for forming active elements corresponding to the B colored layers 18(B), that is, at positions closer to the B colored layers 18(B) than to the G colored layers 18(G).

According to this arrangement for the spacers 14, even if a relative positional deviation occurs between a pair of substrates opposite to each other, the spacers 14 are prevented from getting into the G colored regions. In addition, a plurality of spacers 14 may be formed between the respective colored layers.

Tenth Embodiment of Electro-optical Device

Figure 11:
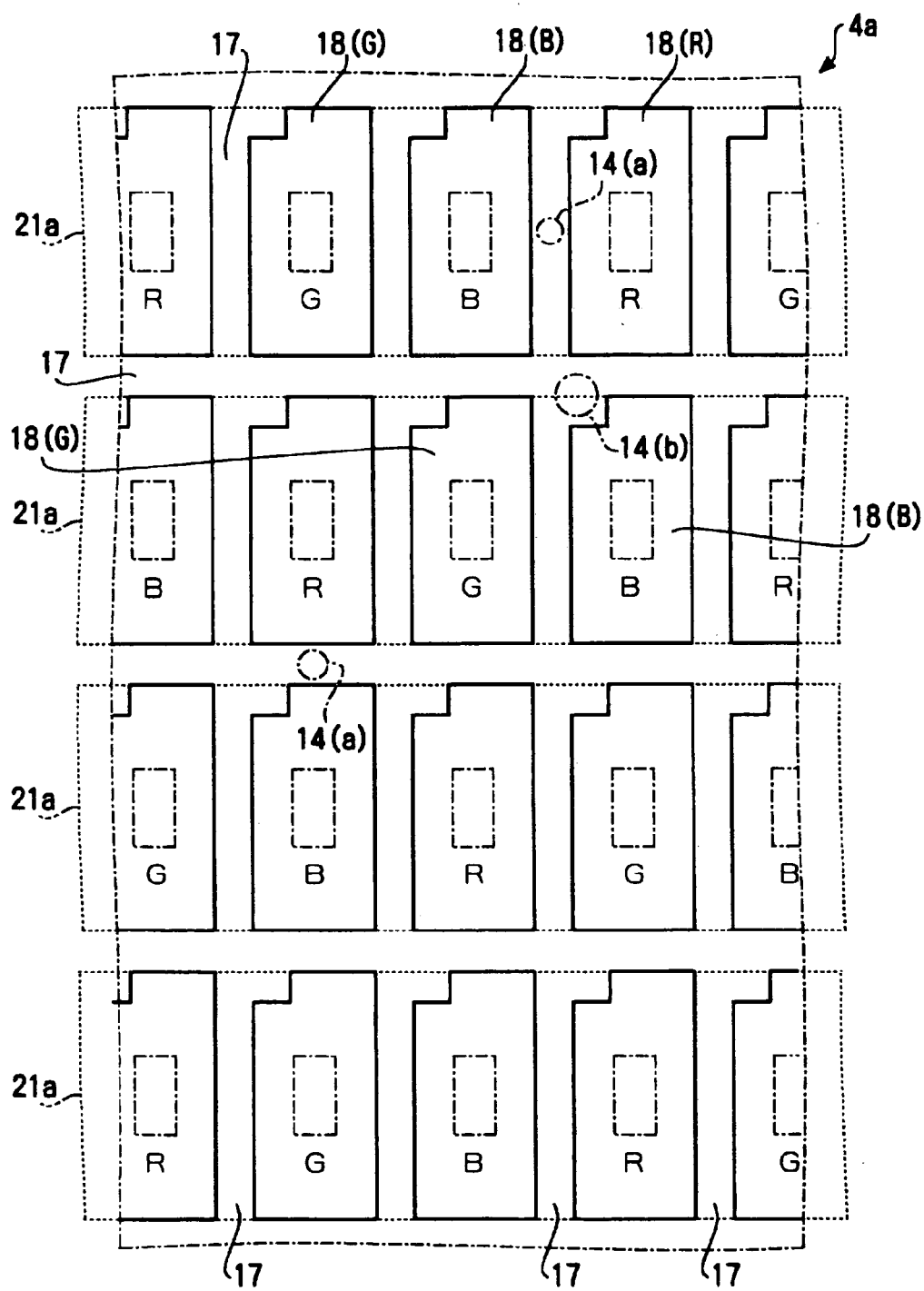
FIG. 11 is a plan view showing a part of the substrate on which the colored layers are formed as a main part of the electro-optical device according to still another embodiment of the present invention.

FIG. 11 shows an electro-optical device according to yet still another embodiment of the present invention. In particular, FIG. 10 shows the positional relationship between the spacers 14 and the colored layers 18. In the present embodiment, the colored layers 18 of R, G, and B colors are aligned in an oblique mosaic arrangement, that is, in a diagonal arrangement. In the oblique mosaic arrangement, each of the R, G, and B colors is diagonally arranged from the upper left side to the lower right side, and R, G, and B colors are alternately arranged in a line in the horizontal direction.

In the oblique mosaic arrangement, as indicated by reference numeral 14(*a*), the spacers 14 may be arranged between the B colored layers 18(B) and the R colored layer 18(R), but may not be arranged around the G colored layers 18(G). In addition, as indicated by reference numeral 14(*b*), the spacers 14 may be formed in regions for forming active elements corresponding to the B colored layers 18(B), that is, at positions closer to the B colored layers 18(B) than to the G colored layers 18(G).

According to this arrangement for the spacers 14, even if a relative positional deviation occurs between a pair of substrates opposite to each other, the spacers 14 are prevented from getting into the G colored regions. In addition, a plurality of spacers 14 may be formed between the respective colored layers.

Eleventh Embodiment of Electro-optical Device

Figure 12:
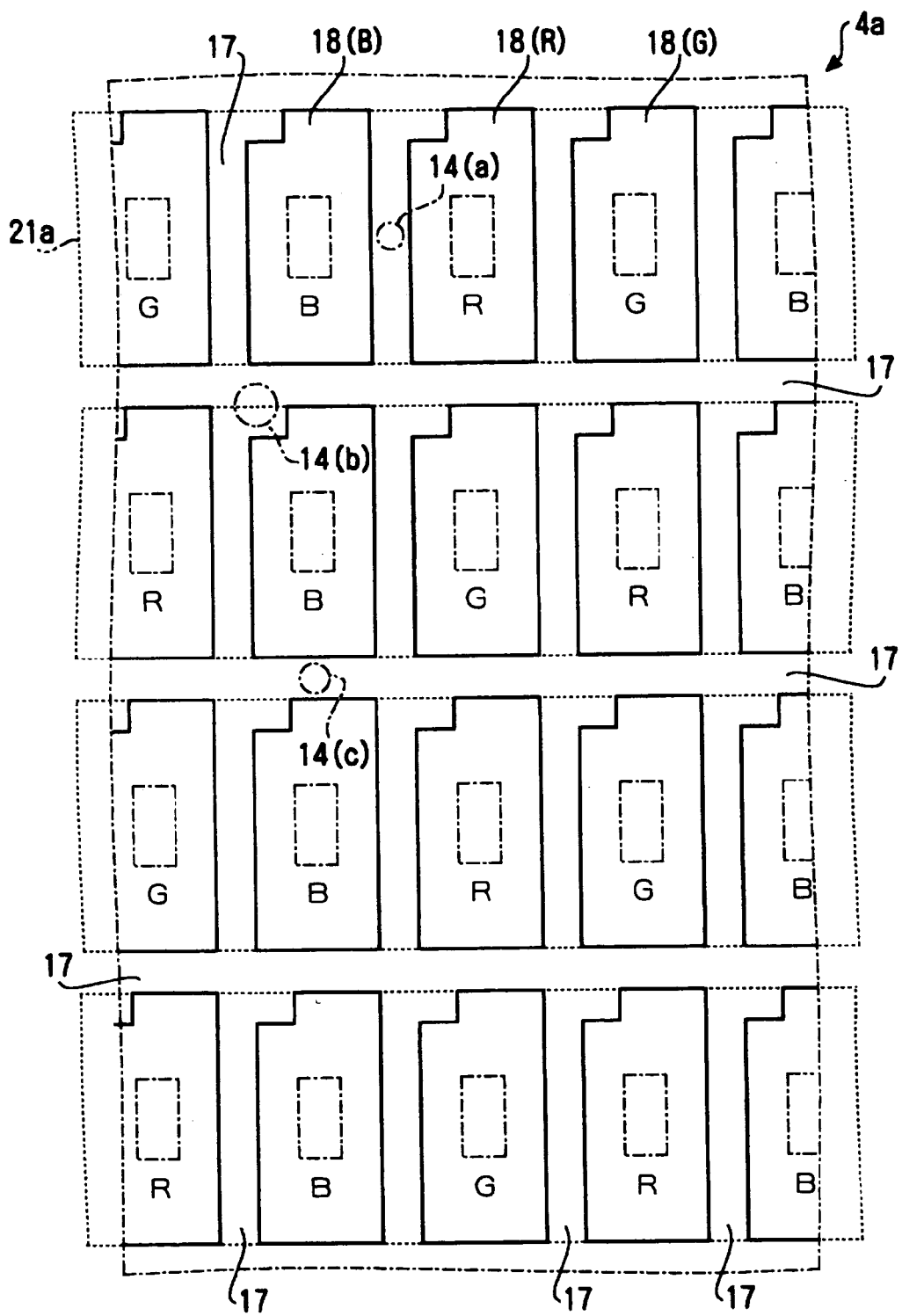
FIG. 12 is a plan view showing a part of the substrate on which the colored layers are formed as a main part of the electro-optical device according to still another embodiment of the present invention.

FIG. 12 shows an electro-optical device according to yet still another embodiment of the present invention. In particular, FIG. 12 shows the positional relationship between spacers 14 and colored layers 18. In the present embodiment, the colored layers 18 of R, G, and B colors are aligned in a Pentile arrangement. In the Pentile arrangement, the B colored layers 18(B) are arranged in a line in the lengthwise direction, and the R colored layers 18(R) and the G colored layers 18(G) are arranged between a pair of columns of B colored layers 18(B) such that the order of the R colored layer and the G colored layer is changed for every row.

In the Pentile arrangement, as indicated by reference numeral 14(*a*), the spacers 14 may be arranged between the B colored layers 18(B) and the R colored layers 18(R), but may not be arranged around the G colored layers 18(G). In addition, as indicated by reference numeral 14(*b*), the spacers 14 may be formed in regions for forming active elements corresponding to the B colored layers 18(B), that is, in positions closer to the B colored layers 18(B) than to the G colored layers 18(G). Furthermore, as indicated by reference numeral 14(*c*), the spacers may be formed between a pair of B colored layers 18(B) adjacent to each other.

According to this arrangement for the spacers 14, even if a relative positional deviation occurs between a pair of substrates opposite to each other, the spacers 14 are prevented from getting into the G colored regions. In addition, a plurality of spacers 14 may be formed between the respective colored layers 18.

Twelfth Embodiment of Electro-optical Device

Figure 13:
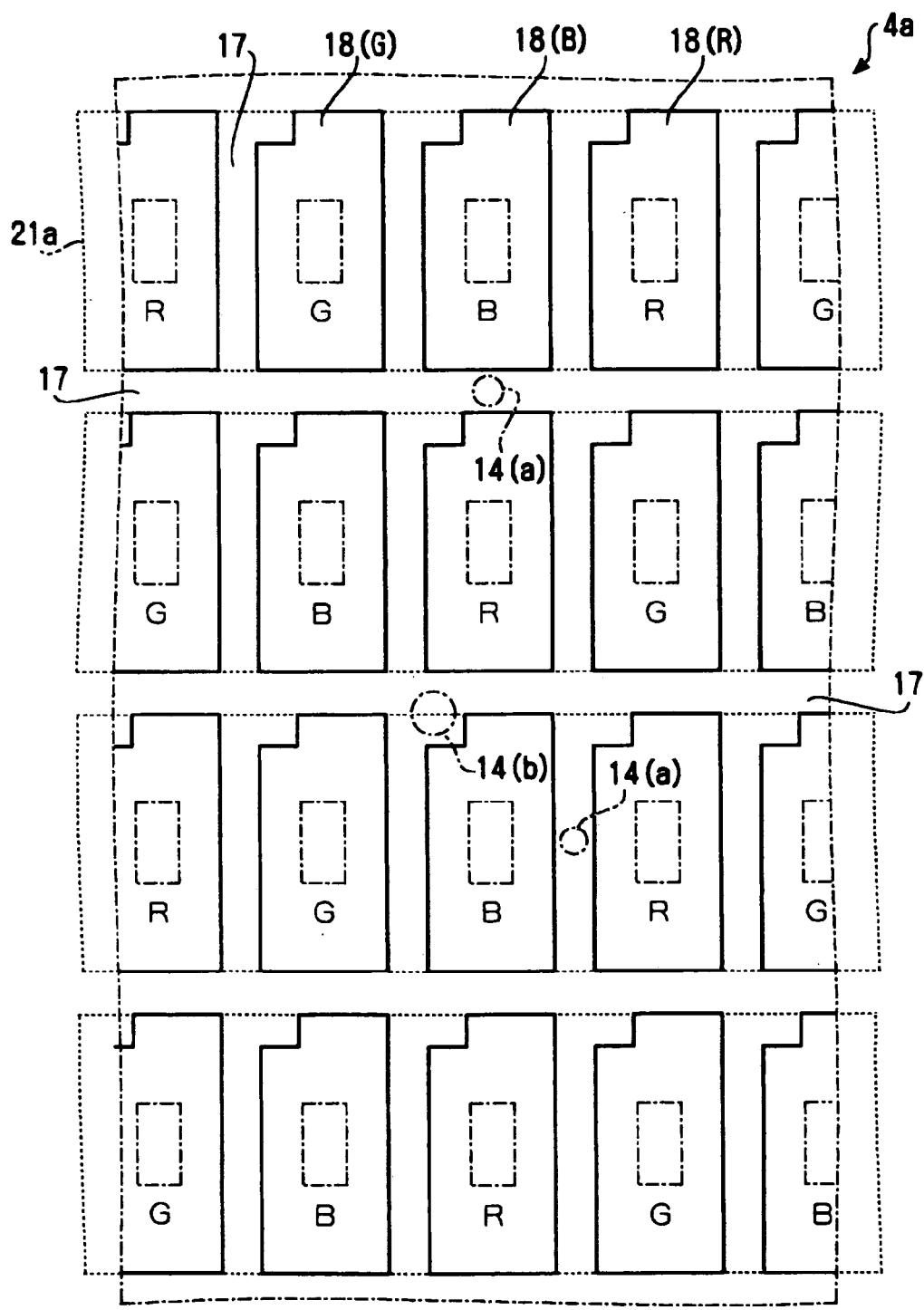
FIG. 13 is a plan view showing a part of the substrate on which the colored layers are formed as a main part of the electro-optical device according to still another embodiment of the present invention.

FIG. 13 shows an electro-optical device according to yet still another embodiment of the present invention. In particular, FIG. 13 shows the positional relationship between the spacers 14 and the colored layers 18. In the present embodiment, the colored layers 18 of R, G, and B colors are aligned in a pentagonal arrangement. In the pentagonal arrangement, R, G, and B colored layers are alternately and repeatedly arranged in a line in the horizontal direction, and a row of R, G, R, G, . . . , a row of G, B, G, B, . . . , and a row of B, R, B, R, . . . are arranged in the lengthwise direction, respectively.

In this pentagonal arrangement, as indicated by reference numeral 14(*a*), the spacers 14 may be arranged between the B colored layers 18(B) and the R colored layers 18(R), but may not be arranged around the G colored layers 18(G). In addition, as indicated by reference numeral 14(*b*), the spacers 14 may be formed in regions for forming active elements corresponding to the B colored layers 18(B), that is, at positions closer to the B colored layers 18(B) than to the G colored layers 18(G).

According to this arrangement for the spacers 14, even if a relative positional deviation occurs between a pair of substrates opposite to each other, the spacers 14 are prevented from getting into the G colored regions. In addition, a plurality of spacers 14 may be formed between the respective colored layers 18.

Modifications

In the present embodiment, as shown in FIG. 2, the colored layers 18 are provided on the first substrate 4*a*, and the spacers 14 are provided on the second substrate 4*b*. In other words, the colored layers 18 and the spacers 14 are provided on different substrates. However, instead of the aforementioned structure, the present invention includes a panel structure in which the colored layers 18 and the spacers 14 are formed on the same substrate.

In case of this structure, it is not apprehended that a positional deviation may occur between the colored layers 18 and the spacers 14 due to an assembly error occurring when the pair of substrates is attached to each other. However, in this case, when the colored layers 18 are formed on one substrate and the spacers 14 are formed on the colored layers 18, the relative position of the colored layers 18 and the spacers 14 may be deviated from a normal position. This positional deviation is referred to as an alignment deviation.

The present invention is applicable to a case in which the colored layers 18 and the spacers 14 are formed on the same substrate so as to overlap with each other. More specifically, the colored layers 18 and the spacers 14 may be provided so as to have the positional relationship as shown in FIGS. 5, 6, 7, 8, 9, 10, 11, 12, and 13.

Next, in the aforementioned embodiment, the present invention is applied to an active matrix liquid crystal device using TFD elements 27 that are two terminal-type switching elements. However, the present invention may be applied to devices using two terminal-type switching elements other than the TFD elements. In addition, the present invention can be applied to an active matrix liquid crystal device using three terminal-type switching elements such as thin film transistors (TFTs). Furthermore, the present invention can be applied to a simple matrix liquid crystal device having a structure in which switching elements are not used. Furthermore, the present invention is not limited to the liquid crystal devices and may be applied to various electro-optical devices, such as an organic EL device, a plasma display device, and an electrophoresis device.

First Embodiment of Method of Manufacturing Electro-optical Device

Figure 14:
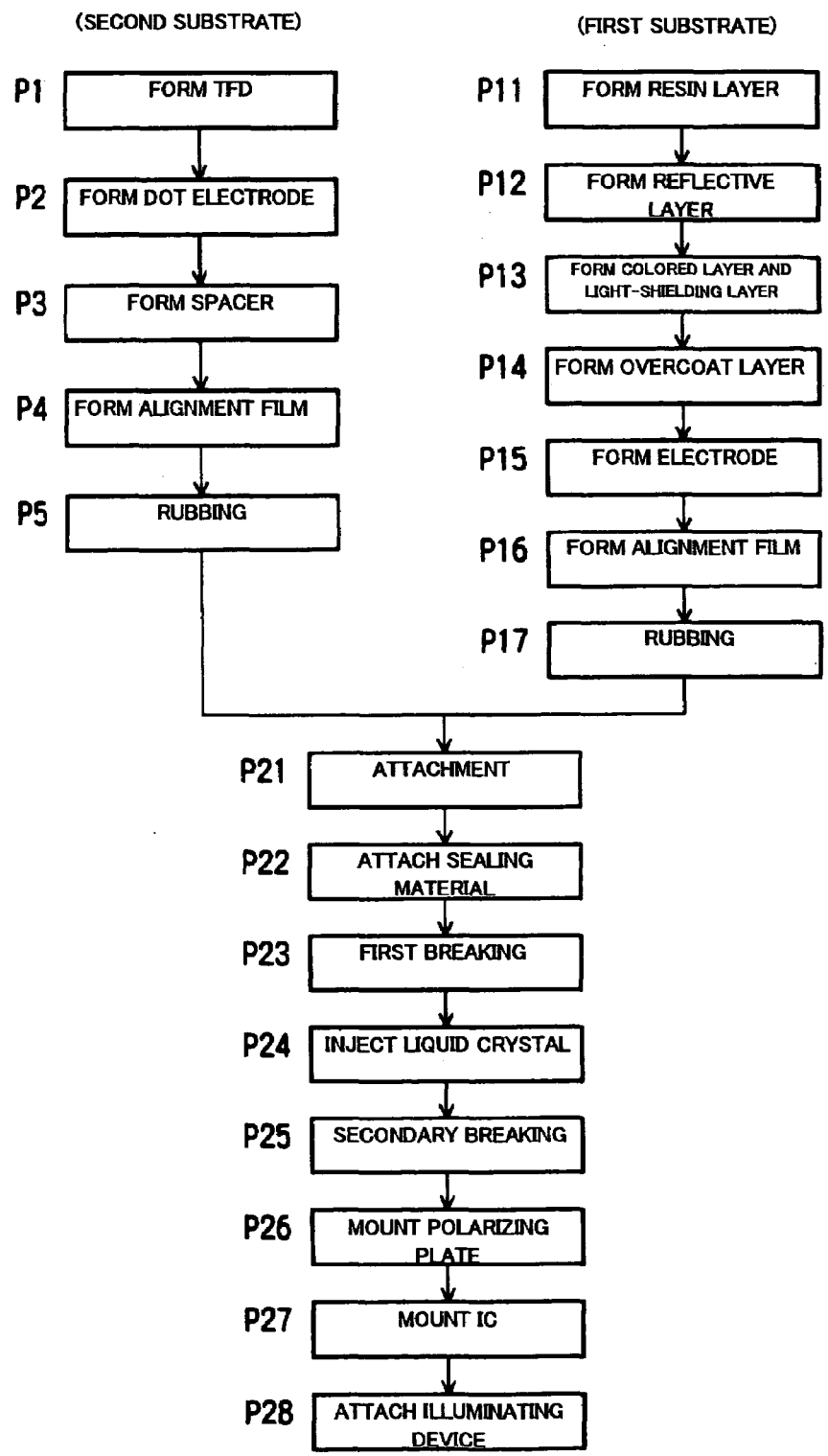
FIG. 14 is a flow diagram showing a method of manufacturing an electro-optical device according to an embodiment of the present invention.

Hereinafter, as an example of a method of manufacturing an electro-optical device according to the present invention, a method of manufacturing the liquid crystal device shown in FIG. 1 will be described with reference to the flowchart of FIG. 14. In FIG. 14, processes P1 to P5 are processes for forming the second substrate 4*b* of FIG. 1. In addition, processes P11 to P17 are processes for forming the first substrate 4a of FIG. 1. Furthermore, processes P21 to P28 are processes for attaching the first substrate 4a to second substrates 4b to complete a liquid crystal device.

In the manufacturing method according to the present embodiment, the first substrate 4a and the second substrate 4b shown in FIG. 1 are not formed one by one. In case of the first substrate 4a, a plurality of first substrates 4a is simultaneously formed using a first mother base having a sufficient area to form the plurality of first substrates 4a. In addition, in case of the second substrate 4b, a plurality of second substrates 4b is simultaneously formed using a second mother base having a sufficient area to form the plurality of second substrates 4b. The first mother base and the second mother base are made of, for example, transparent glass or plastic.

First, in process P1 of FIG. 14, the TFD elements 27 and the wiring lines 26 shown in FIG. 1(a) are formed on the surface of the second mother base. Next, in process P2, the dot electrodes 21b shown in FIG. 1(a) are formed of ITO by a photolithography process and an etching process.

Subsequently, in process P3, the spacers 14 of FIG. 2 are formed of a photosensitive resin using an appropriate patterning process, for example, a photolithography process so as to satisfy the following two conditions. First, for example, as shown in FIG. 4, each of the spacers 14 is formed so as to overlap with the TFD element 27 and a portion in which the dot electrode 21b opposite to the B colored layer 18(B) is connected to the TFD element 27. Second, as shown in FIG. 5, each of the spacers 14 is formed in the cut-out region provided at the upper left corner of the B colored layer 18(B) to correspond to the TFD element 27, that is, at a position closer to the B colored layer 18(B) than to the G colored layer 18(G).

Next, in process P4, the alignment film 22b of FIG. 2 is formed by a coating process or a printing process, and in process P5, an alignment process, for example, rubbing is performed on the alignment film 22b. In this way, panel elements corresponding to the plurality of second substrates 4b are formed on the second mother base. Hereinafter, this planar structure is referred to as a second mother board. In addition, in actual processes, heat treatment or other processes may be performed thereon as occasion demands, but the explanation thereof is omitted in the above description.

Next, in process P11 of FIG. 14, the first layer 15a of the resin layer 15 shown in FIG. 2 is formed on the surface of the first mother board by performing, for example, a photolithography process on a photosensitive resin. Fine unevenness is formed on the surface of the first layer 15a. Then, the second layer 15b made of a photosensitive resin is thinly coated on the first layer 15a, thereby forming the resin layer 15.

Next, in process P12 of FIG. 14, the reflective layer 16 of FIG. 2 is formed of a light-reflecting material, such as Al or an Al alloy, using a photolithography process and an etching process. In this case, apertures 28 are formed in the respective display dots D to form light-reflecting portions R and light-transmitting portions T. Next, in process P13, R, G, and B colored layers 18 of FIG. 2 are sequentially formed. For example, a coloring material obtained by dispersing the pigment or dye of each color in a photosensitive resin is formed in a predetermined arrangement, for example, in a stripe arrangement as shown in FIG. 5 by a photolithography process. In this case, the light-shielding layer 17 is formed in a lattice pattern so as to fill the gap between the respective colored layers, that is, the gap between a plurality of display dots D formed by stacking R, G, and B colored layers.

Next, in process P14, an overcoat layer 19 of FIG. 2 is formed of a photosensitive resin, such as acryl resin or polyimide resin, using a photolithography process. Then, in process P15 of FIG. 14, the band-shaped electrodes 21a of FIG. 2 are formed of ITO using a photolithography process and an etching process. In addition, the alignment film 22a of FIG. 2 is formed in process P16, and rubbing as an alignment process is performed in process P17.

In this way, panel elements corresponding to a plurality of first substrates 4a are formed on the first mother base. Hereinafter, such a planar structure is referred to as a first mother board. In addition, in actual processes, heat treatment or other processes may be performed as occasion demands, but the explanation thereof is omitted in the aforementioned embodiment.

Next, in process P21 of FIG. 14, the first mother board and the second mother board are attached to each other. As a result, a large-sized panel structure in which the first mother board and the second mother board are attached to each other such that their liquid crystal device regions are attached by the sealing material 6 of FIG. 1 interposed therebetween is formed.

In addition, alignment marks for determining the positions of the first and second mother boards are formed at positions corresponding to the first mother base constituting the first mother board and the second mother base constituting the second mother board. When attachment is performed in process P21, a predetermined positional relationship is established by the alignment marks. For example, the positions of the first mother board and the second mother board are determined by inserting one alignment mark into the other alignment mark.

At this time, according to circumstances, a positional deviation between the first mother board and the second mother board, that is, a positional deviation between the first substrate 4a and the second substrate 4b in each liquid crystal device, may occur. In this case, according to the present embodiment, in process P3, the spacers 14 are formed so as to overlap with the TFD elements 27 as shown in FIG. 4. Furthermore, as shown in FIG. 5, the spacers 14 are formed so as to be situated in cut-out regions provided at the upper left corners of the B colored layers 18(B), that is, more close to the B colored layers 18(B) than to the G colored layers 18(G). Thus, even if a positional deviation occurs between the first and second mother boards, there is little possibility that the spacers 14 may get into the G colored layers 18(G). Therefore, it is possible to prevent a reduction in contrast.

Next, the sealing material 6 (see FIG. 1) included in the large-sized panel structure having the above structure is hardened in process P22 to attach the first and second mother boards. Then, in process P23, the panel structure is first cut off, that is, is first broken into a plurality of medium-sized panel structures, that is, a so-called plurality of strip-shaped panel structures in which a plurality of the liquid crystal display panels 2 of FIG. 1 is arranged in a line. Apertures 6a are previously formed at appropriate positions of the sealing material 6. When the strip-shaped panel structures are formed by the first breaking, the apertures 6a of the sealing material 6 are exposed to the outside.

Next, in process P24 of FIG. 14, liquid crystal is injected into each liquid crystal panel through the aperture 6a of the sealing material 6. After injection is completed, the apertures 6a are sealed with resin. Next, in process P25, the strip-shaped panel structures are cut off into a plurality of the liquid crystal display panels 2 of FIG. 1 by secondary cutting, that is, secondary breaking.

Next, in process P26 of FIG. 14, the polarizing plates 23a and 23b are mounted on the liquid crystal display panel 2 of FIG. 1 by bonding. Next, in process P27, the driving ICs 39a and 39b are mounted, and in process P28, the illuminating device 3 of FIG. 1 is attached. As such, the liquid crystal device 1 is completed.

In the present embodiment, in process P3, the spacers 14 are formed at positions shown in FIG. 5. However, alternatively, the spacers 14 may be formed at positions shown in FIGS. 6, 7, 8, 9, 10, 11, 12, and 13.

Second Embodiment of Method of Manufacturing Electro-optical Device

According to the present embodiment, in process P3 of FIG. 14, the spacers 14 are formed on the side of the second substrate 4b, and in process P13, the colored layers 18 are formed on the side of the first substrate 4a. In other words, the spacers 14 and the colored layers 18 are formed on different substrates. However, considering another method of manufacturing an electro-optical device, the spacers 14 and the colored layers 18 may be formed on the same substrate. In this case, it is not considered that a positional deviation may occur between the spacers 14 and the colored layers 18 when a pair of mother boards is attached to each other.

However, when a colored layer 18, spacers 14, electrodes, an alignment film, and other elements are sequentially formed on one mother board, in general, an alignment mark is formed at an appropriate position on one mother board, and the respective elements are formed at predetermined positions based on the alignment mark so as to overlap with each other. In this case, as occasion demands, an alignment deviation may occur between the elements or between the colored layer 18 and the spacer 14.

According to the present invention, the spacers 14 are formed at the positions around the colored layers 18 as shown in FIGS. 5, 6, 7, 8, 9, 10, 11, 12, and 13. Therefore, even if an alignment mark deviation occurs between the colored layers 18 and the spacers 14, there is little possibility that the spacers 14 may get into the G colored layers 18(G). Thus, a reduction in contrast can be prevented in the electro-optical device manufactured as described above.

Embodiment of Electronic Apparatus

Hereinafter, an electronic apparatus according to an embodiment of the present invention will be described. The present embodiment shows an example of the present invention and is not limited to thereto.

Figure 15:
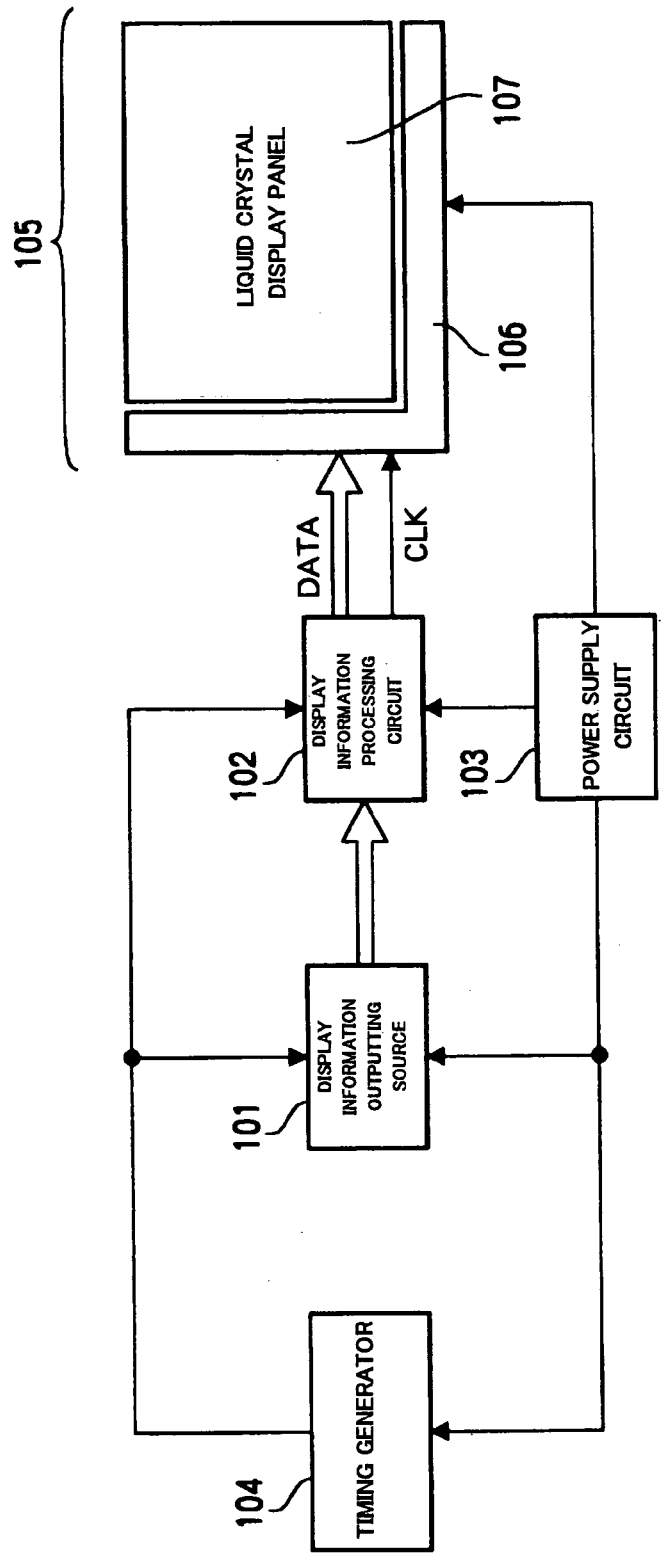
FIG. 15 is a block diagram showing an electronic apparatus according to an embodiment of the present invention.

FIG. 15 shows an electronic apparatus according to an embodiment of the present invention. The electronic apparatus includes a display information outputting source 101, a display information processing circuit 102, a power supply circuit 103, a timing generator 104, and a liquid crystal device 105. The liquid crystal device 105 includes a liquid crystal display panel 107 and a driving circuit 106.

The display information outputting source 101 includes a memory, such as a random access memory (RAM), a storage unit, such as every kind of disc, and a tuning circuit for tuning and outputting digital image signals. The display information outputting source 101 supplies display information, such as an image signal having a predetermined format, to the display information processing circuit 102 according to a variety of clock signals generated by the timing generator 104.

Next, the display information processing circuit 102 includes a plurality of well-known circuits, such as an amplifying and inverting circuit, a rotation circuit, a gamma correction circuit, and a clamp circuit. The display information processing circuit 102 processes the inputted display information and supplies image signals together with clock signals CLK to the driving circuit 106. Herein, the driving circuit 106 is the general term for a testing circuit, a scanning line driving circuit (not shown), and a data line driving circuit (not shown). In addition, the power supply circuit 103 supplies a predetermined power supply voltage to each of the elements. For example, the liquid crystal device 105 may have the same structure as that of the liquid crystal device 1 shown in FIG. 1.

Figure 16:
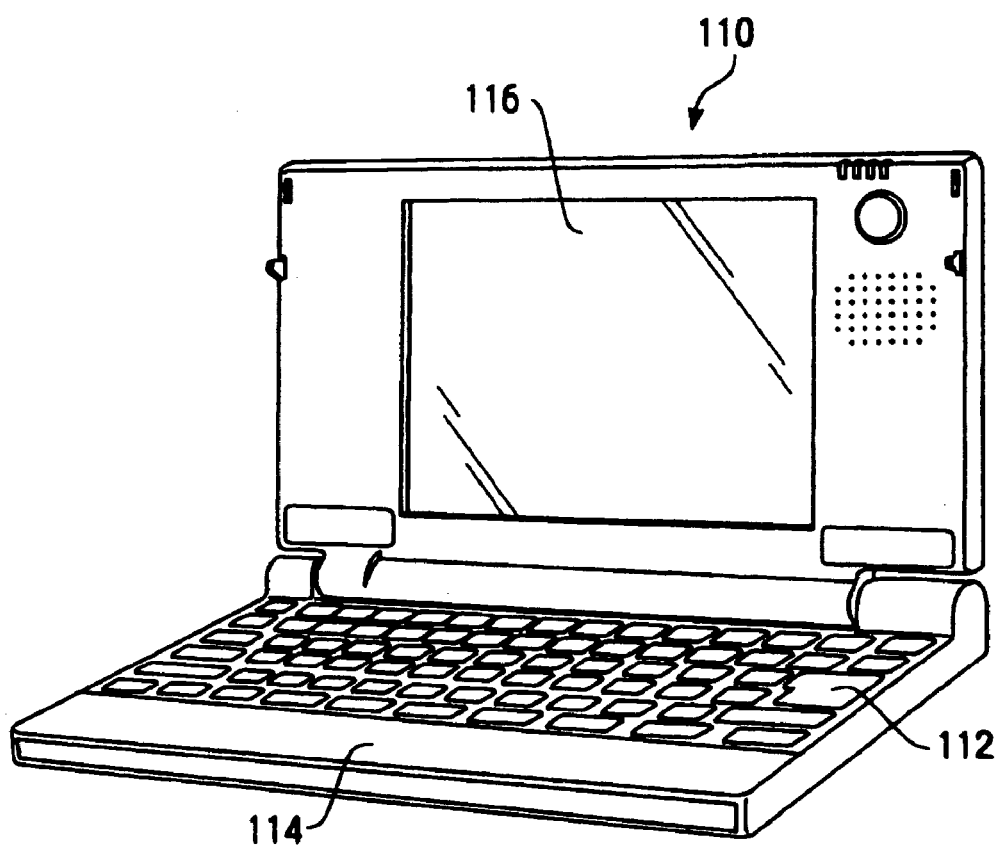
FIG. 16 is a perspective view showing an electronic apparatus according to another embodiment of the present invention.

FIG. 16 shows a mobile personal computer as an example of an electronic apparatus according to another embodiment of the present invention. A personal computer 110 shown here includes a main body 114 having a keyboard 112 and a liquid crystal display unit 116. The liquid crystal display unit 116 may use the liquid crystal device 1 shown in FIG. 1 as a display unit.

Figure 17:
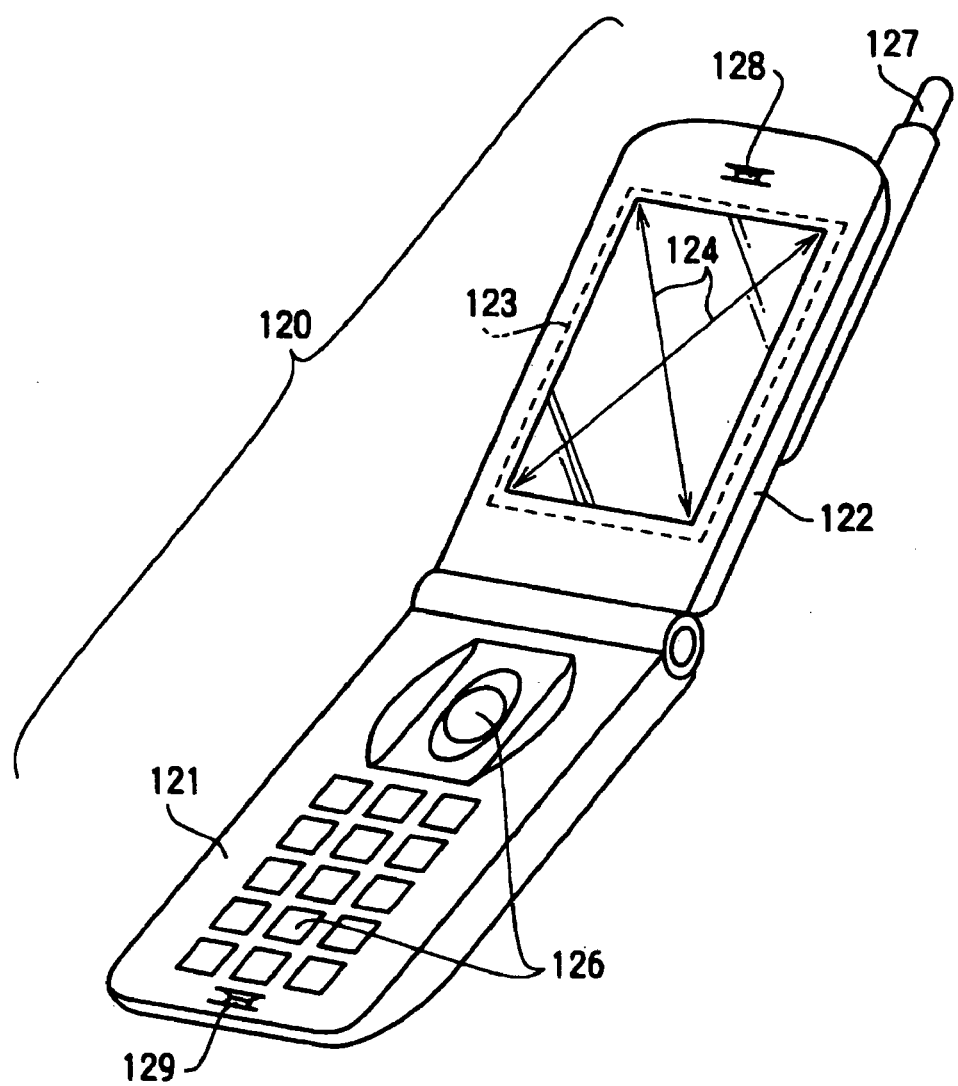
FIG. 17 is a perspective view showing an electronic apparatus according to still another embodiment of the present invention.

FIG. 17 shows a mobile telephone as an example of an electronic apparatus according to another embodiment of the present invention. A mobile telephone 120 shown here includes a main body 121 and a display unit 122 openably provided with respect to the main body 121. A display device 123 configured by the electro-optical device, such as a liquid crystal device, is disposed in the display unit 122, and a variety of display items related to telephone communication can be displayed on a display screen 124 of the display unit 122. Manipulation buttons 126 are provided on the front side of the main body 121.

An antenna 127 is attached to the mobile telephone 120 so as to be freely retractable from one end of the display unit 122. A speaker is provided in a receiver 128, and a microphone is built in a transmitter 129. A control unit for controlling the operation of the display device 123 is accommodated in the main body 121 or the display unit 122 as a part of a control unit for controlling the whole operation of the mobile telephone or is accommodated separately from the control unit.

Figure 18:
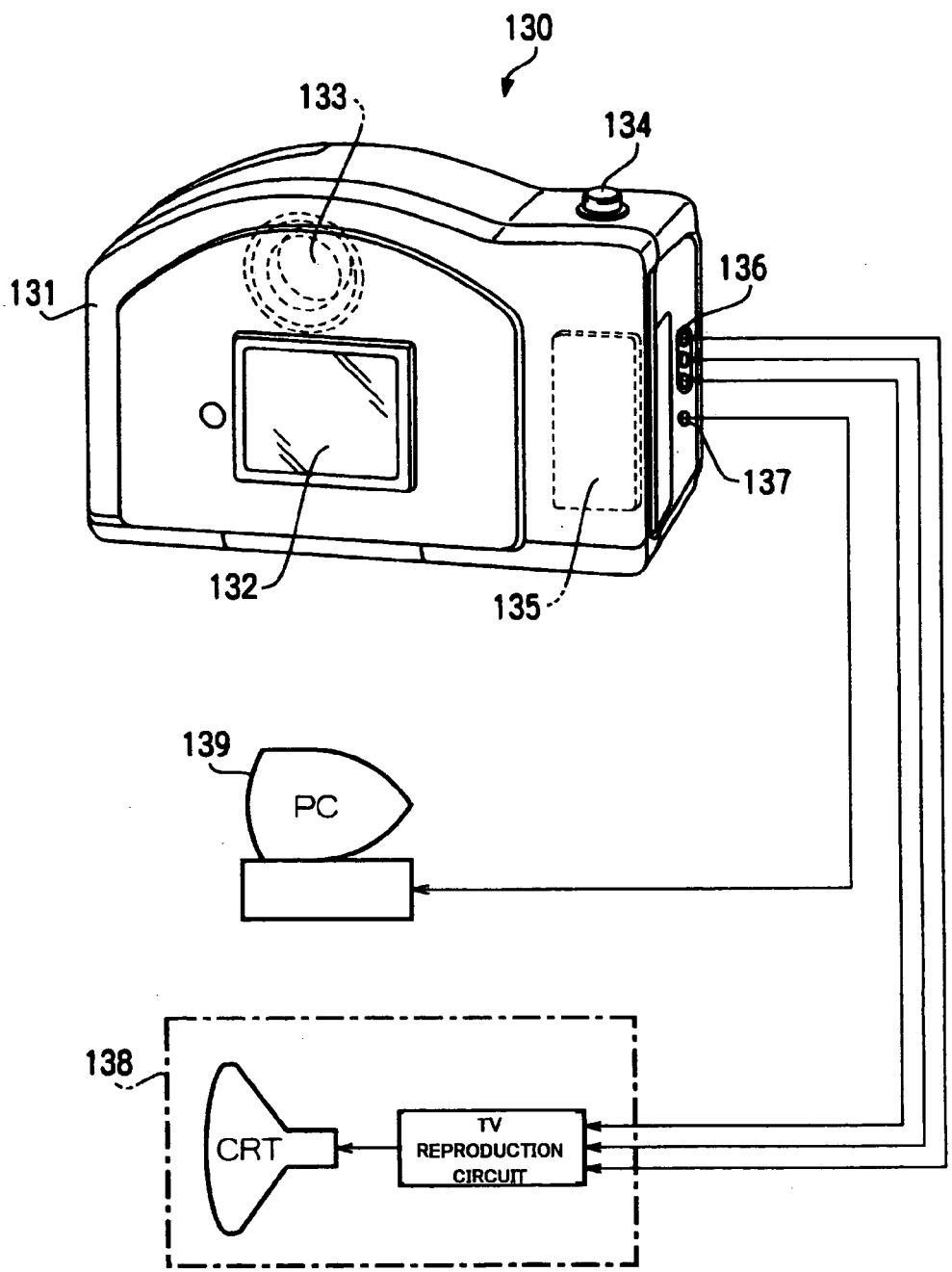
FIG. 18 is a perspective view showing an electronic apparatus according to still another embodiment of the present invention.

FIG. 18 shows a case in which a liquid crystal device is used as a finder in a digital still camera according to another embodiment of the electronic apparatus of the present invention. In a digital still camera 130, a liquid crystal display unit 132 is provided on the rear side of a case 131. The liquid crystal display unit 132 operates as a finder for displaying a subject. The liquid crystal display unit 132 may be configured using, for example, the liquid crystal device 1 shown in FIG. 1.

A light-receiving unit 133 including an optical lens and a CCD is provided on the front side (the rear side of the drawing) of the case 131. If a photographer identifies a subject image displayed on the liquid crystal display unit 132 and presses a shutter button 134, an imaging signal of the CCD at that time is transmitted to a memory of a circuit board 135 and is stored therein.

A video signal output terminal 136 and an input/output terminal 137 for data communication are provided on the side surface of the case 131. A television monitor 138 is connected to the video signal output terminal 136, as necessary, and a personal computer 139 is connected to the input/output terminal 137 for data communication, as necessary. The imaging signals stored in the memory of the circuit board 135 are output to the television monitor 138 or the personal computer 139 by predetermined manipulation.

Figure 19:
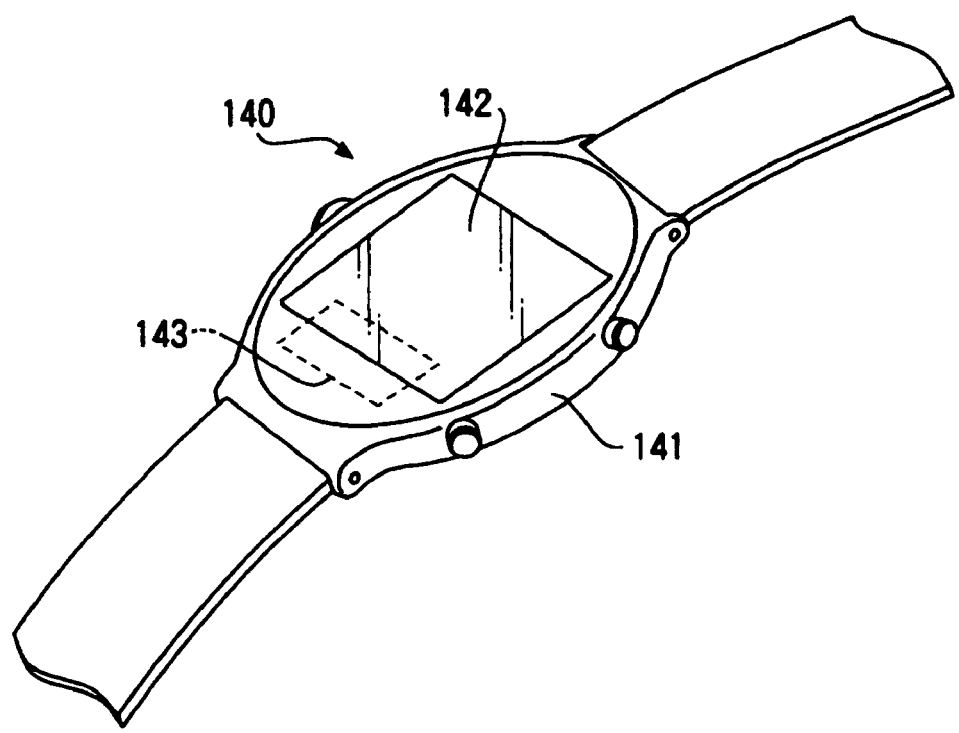
FIG. 19 is a perspective view showing an electronic apparatus according to still another embodiment of the present invention.

FIG. 19 shows a wristwatch-type electronic apparatus as an example of an electronic apparatus according to another embodiment of the present invention. A wristwatch-type electronic apparatus 140 shown in FIG. 14 includes a liquid crystal display unit 142 as a display unit supported by a watch body 141. The liquid crystal display unit 142 is controlled by a control circuit 143 provided in the watch body 141 and displays the date and hour as information. The liquid crystal display unit 142 may be configured using, for example, the liquid crystal device 1 shown in FIG. 1.

Figure 20:
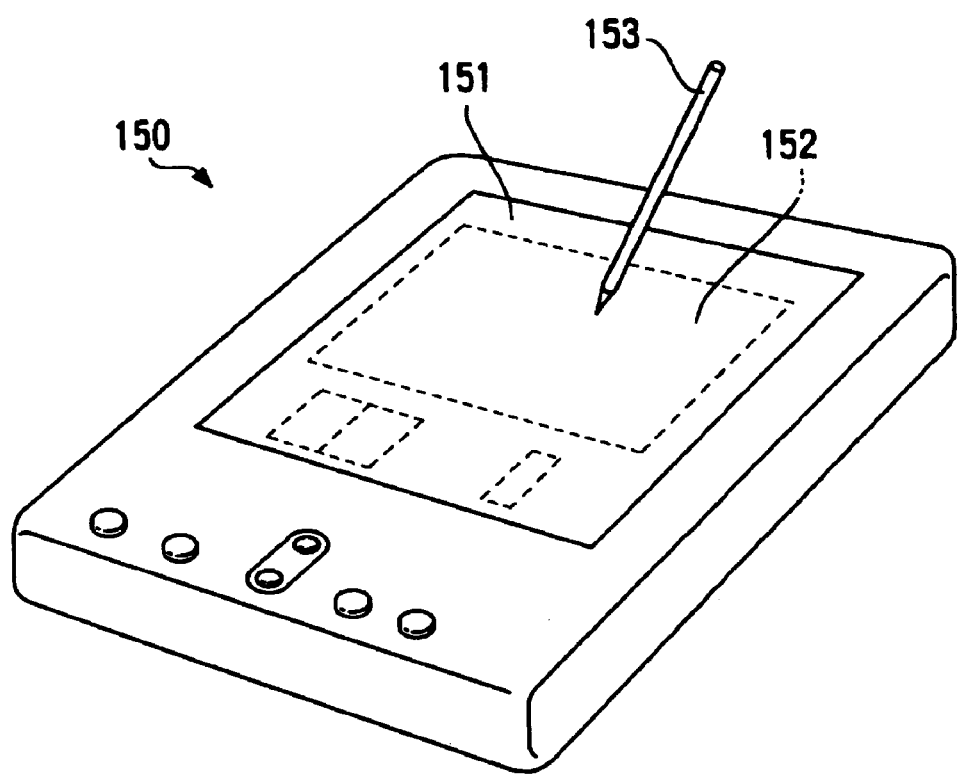
FIG. 20 is a perspective view showing an electronic apparatus according to still another embodiment of the present invention.

FIG. 20 shows a personal digital assistant (PDA) as an example of an electronic apparatus according to another embodiment of the present invention. In a PDA 150 shown in FIG. 15, a touch-type input unit 151, that is, a so-called touch panel-type input unit 151, is provided on the front panel. The input unit 151 is transparent, and a liquid crystal device 152 is disposed as a display unit under the input unit 151.

The user makes an attached pen-type input tool 153 contact with the input surface of the input unit 151 to select buttons or other display items displayed on the liquid crystal device 152 to draw a character and a figure, thereby inputting necessary information therein. A predetermined operation is performed on the input information by a computer in the PDA 150, and the results of operation are displayed on the liquid crystal device 152. The liquid crystal device 152 may be configured using, for example, the liquid crystal device 1 shown in FIG. 1.

Modifications

The present invention may applied to electronic apparatuses which include a liquid crystal TV, a viewfinder-type or monitor direct view-type video tape recorder, a car navigation apparatus, a pager, an electronic organizer, a calculator, a word processor, a workstation, a moving picture telephone, and a POS terminal, in addition to the above-described personal computer, mobile telephone, digital still camera, wristwatch-type electronic apparatus, and PDA.

What is claimed is:

1. An electro-optical device comprising:
a pair of substrates disposed opposite to each other;
an R colored layer, a G colored layer, and a B colored layer that are formed on either one of the pair of substrates and that are aligned in a predetermined arrangement in plan view in which one of the B and R colored layers is adjacent to the G colored layer in at least one of a lengthwise direction and a widthwise direction;
a light-shielding layer provided between the G colored layer and the one of the B and R colored layers that is adjacent to the G colored layer; and
a spacer provided on either one of the pair of substrates and protruding toward the other substrate,
wherein the spacer is formed between the G colored layer and the one of the B and R colored layers that is adjacent to the G colored layer such that a portion of the spacer overlaps the one of the B and R colored layer and another portion of the spacer overlaps the light-shielding layer that is provided between the G colored layer and the one of the B and R colored layers that is adjacent to the G colored layer, the spacer being in a non-overlapping condition with the G colored layer.

2. The electro-optical device of claim 1, further comprising:
a plurality of R colored layers, a plurality of G colored layers, and a plurality of B colored layers that are formed on the one of the pair of substrates and that are aligned in the predetermined arrangement in plan view in which one of the B and R colored layers is adjacent to each of the G colored layers in at least one of the lengthwise direction and the widthwise direction;
a plurality of light-shielding layers provided between each of the G colored layers and the one of the B and R colored layers that is adjacent thereto; and
a plurality of spacers provided on either one of the pair of substrates and protruding toward the other substrate,
wherein the spacers are formed between each of the G colored layers and the one of the B and R colored layers that is adjacent thereto such that a portion of each of the spacers overlaps the one of the B and R colored layers and another portion of each of the spacers overlaps one of the light-shielding layers, each of the spacers being in a non-overlapping condition with the G colored layer.

3. The electro-optical device of claim 2, wherein, in the predetermined arrangement, the R colored layers are aligned along a first direction in plan view, the G colored layers are aligned along a second direction in plan view, and the B colored layers are aligned along a third direction in plan view, and
the first, second, and third directions are parallel to each other.

4. The electro-optical device of claim 2, wherein each of the R colored layers, the G colored layers, and the B colored layers has a generally rectangular shape in plan view in which one of the corners is indented in both the lengthwise direction and the widthwise direction so as to define a cut out region of each of the colored layers.

5. An electro-optical device comprising:
a first substrate having an inside surface;
a second substrate disposed opposite the first substrate facing the inside surface thereof;
a plurality of first colored layers provided on the inside surface of the first substrate, the first colored layers being a green color;
a plurality of second colored layers provided on the inside surface of the first substrate, each of the second colored layers being disposed adjacent one of the first colored layers, the second colored layers being a color different from the first colored layers;
a plurality of light-shielding layers provided on the inside surface of the first substrate between the first and second colored layers; and
a plurality of spacers provided between the first and second substrates, each of the spacers having a first portion overlapping one of the second colored layers and a second portion overlapping a corresponding one of the light-shielding layers, each of the spacers having a non-overlapping position with respect to the first colored layers.

6. The electro-optical device of claim 5, wherein the color of the second colored layers is one of a red color and a blue color.

7. The electro-optical device of claim 6, further comprising a plurality of third colored layers provided on the inside surface of the first substrate, the third colored layers being the other of the red color and the blue color.

8. The electro-optical device of claim 7, wherein the first, second, and third colored layers are disposed on the first substrate in a predetermined arrangement in which the first colored layers are aligned along a first direction, the second colored layers are aligned along a second direction, and the third colored layers are aligned along a third direction, and
the first, second, and third directions are parallel to each other.

9. The electro-optical device of claim 7, wherein each of the first colored layers, the second colored layers, and the third colored layers has a generally rectangular shape in which one of the corners is indented in both a lengthwise direction and a widthwise direction so as to define a cut out region of each of the colored layers.

* * * * *